Jan. 8, 1952     A. R. THOMPSON     2,581,732
APPARATUS FOR FEEDING AND ORIENTING PEARS
Filed Jan. 3, 1945     9 Sheets-Sheet 1
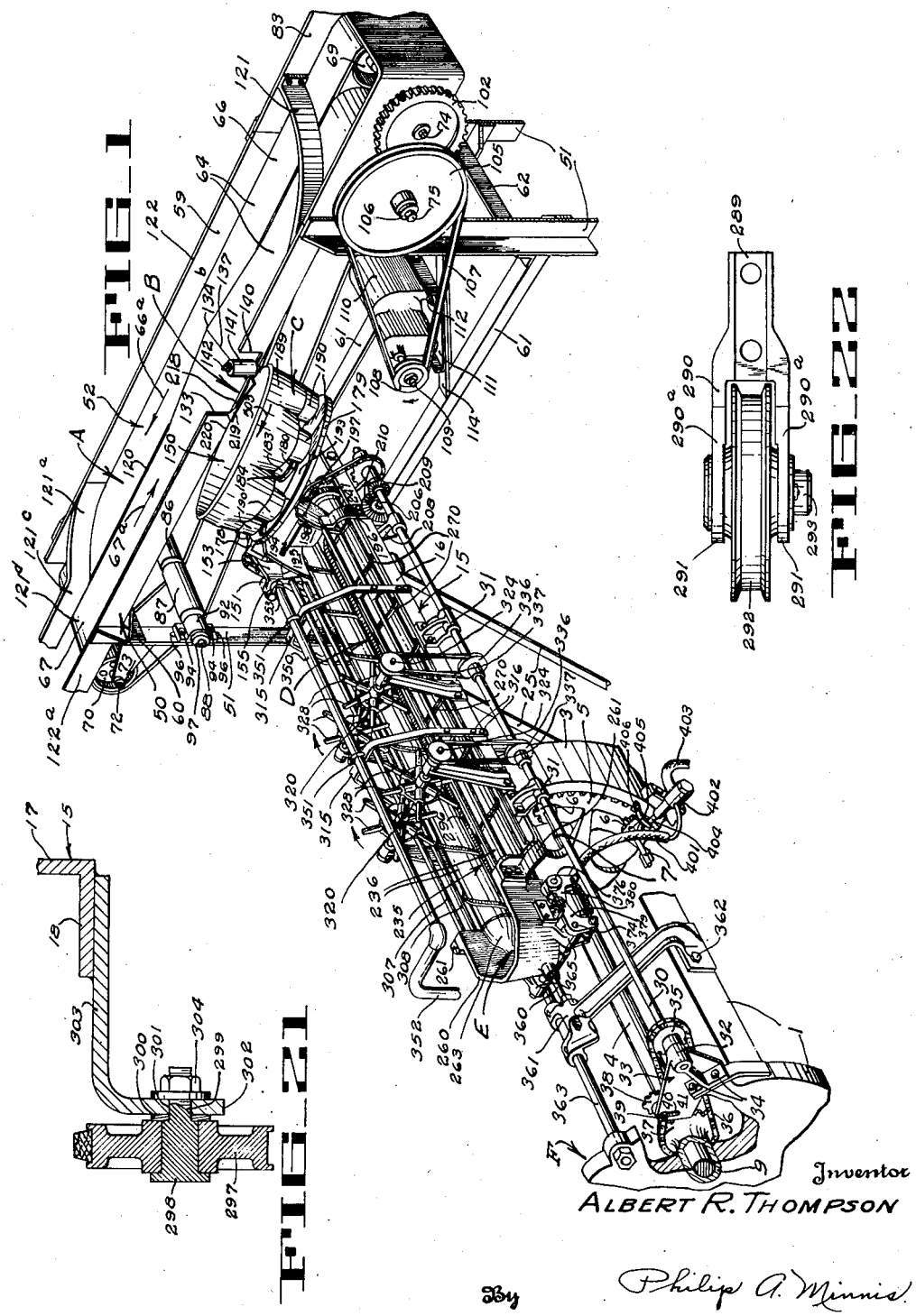
Inventor
ALBERT R. THOMPSON
By Philip A. Minnis
Attorney

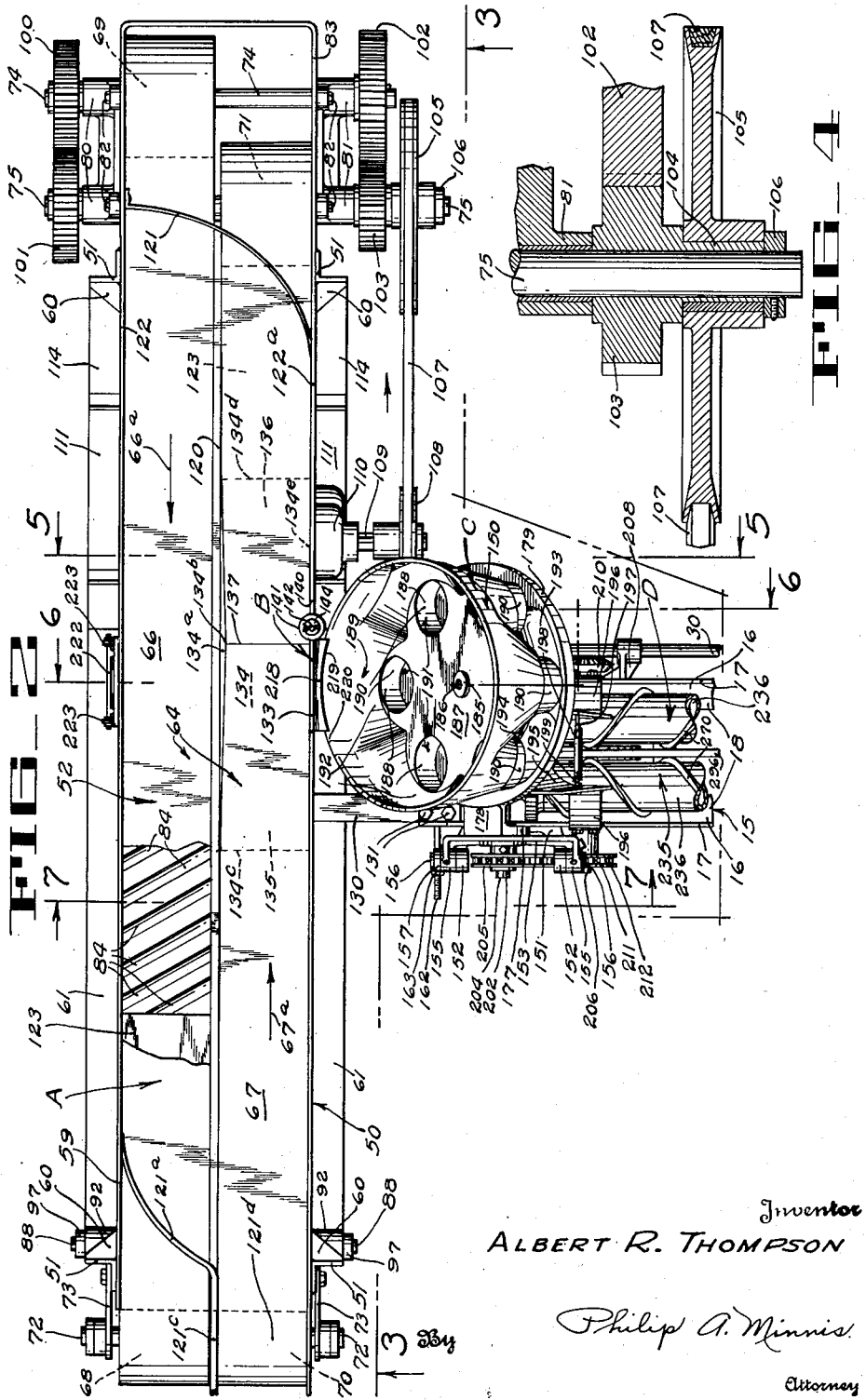
Jan. 8, 1952 — A. R. THOMPSON — 2,581,732
APPARATUS FOR FEEDING AND ORIENTING PEARS
Filed Jan. 3, 1945 — 9 Sheets-Sheet 2
Inventor
ALBERT R. THOMPSON
Philip A. Minnis
Attorney Jan. 8, 1952  A. R. THOMPSON  2,581,732
APPARATUS FOR FEEDING AND ORIENTING PEARS
Filed Jan. 3, 1945  9 Sheets-Sheet 3
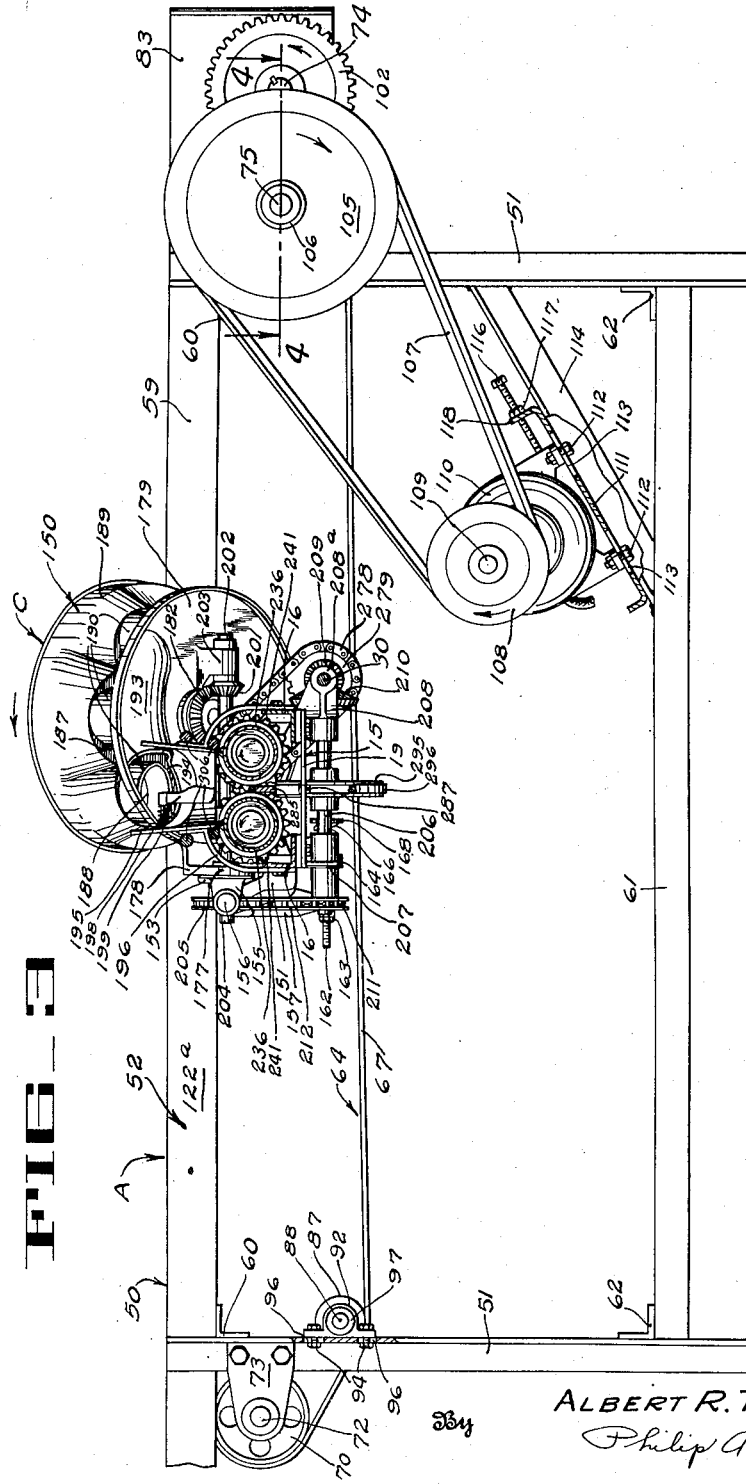
Inventor
ALBERT R. THOMPSON
By Philip G. Minnis
Attorney

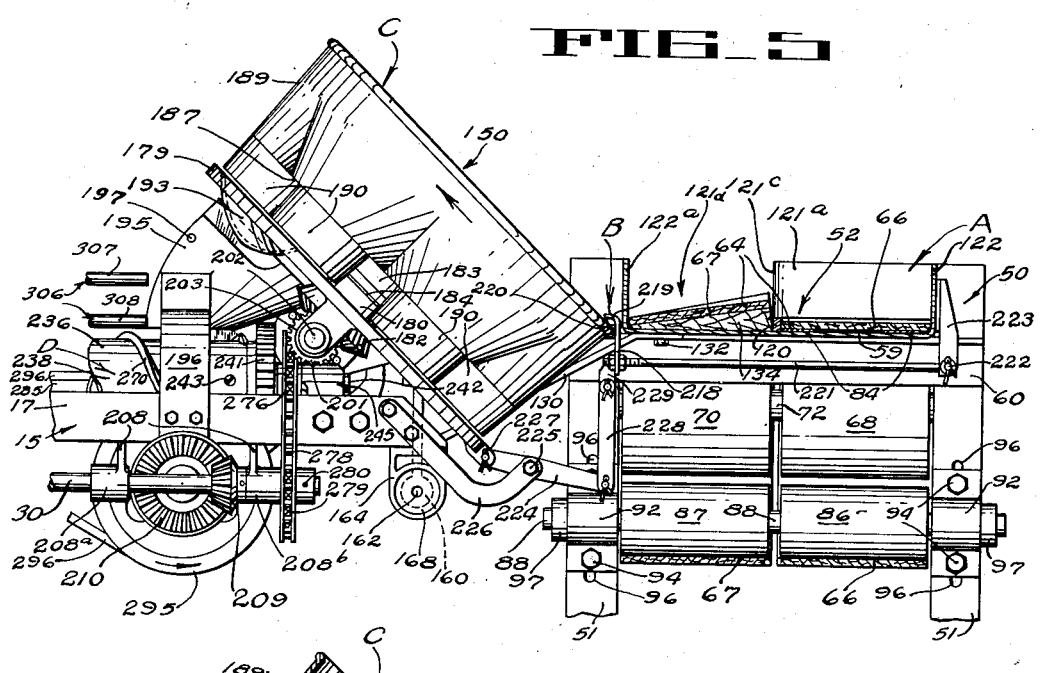
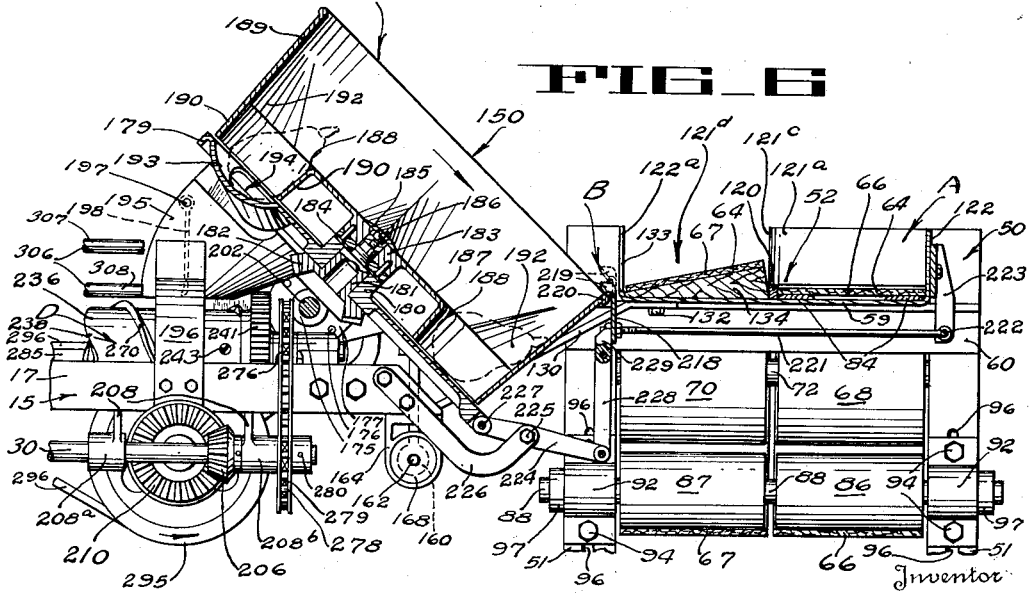

Jan. 8, 1952     A. R. THOMPSON     2,581,732
APPARATUS FOR FEEDING AND ORIENTING PEARS
Filed Jan. 3, 1945     9 Sheets-Sheet 5
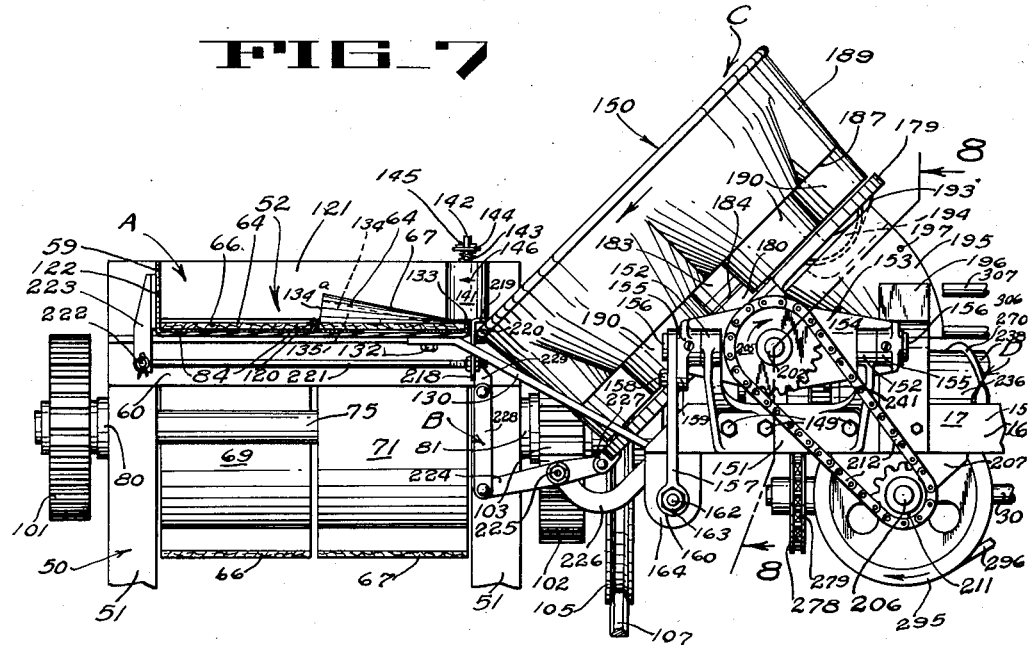
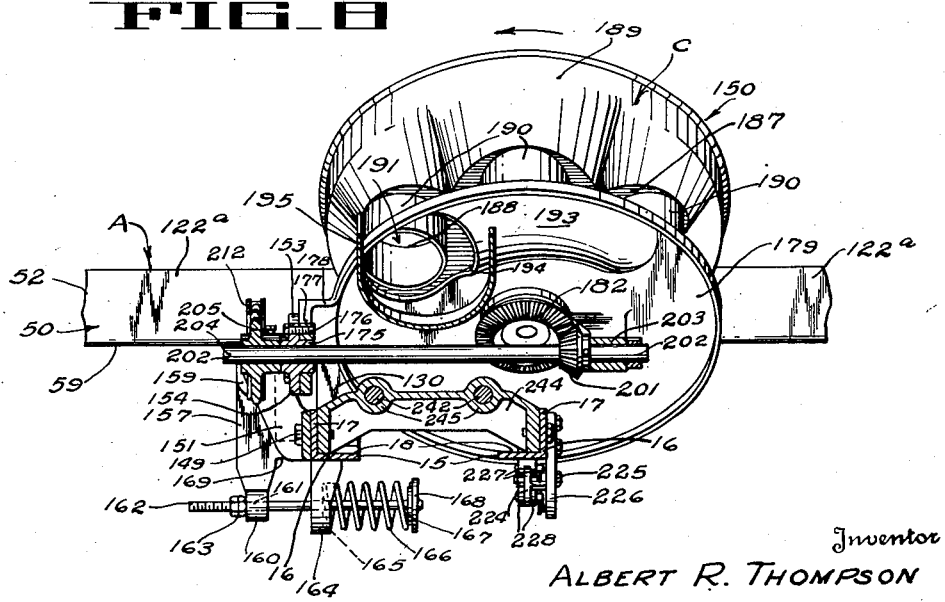
Inventor
ALBERT R. THOMPSON
By Philip G. Minnis
Attorney Jan. 8, 1952  A. R. THOMPSON  2,581,732
APPARATUS FOR FEEDING AND ORIENTING PEARS
Filed Jan. 3, 1945  9 Sheets-Sheet 6
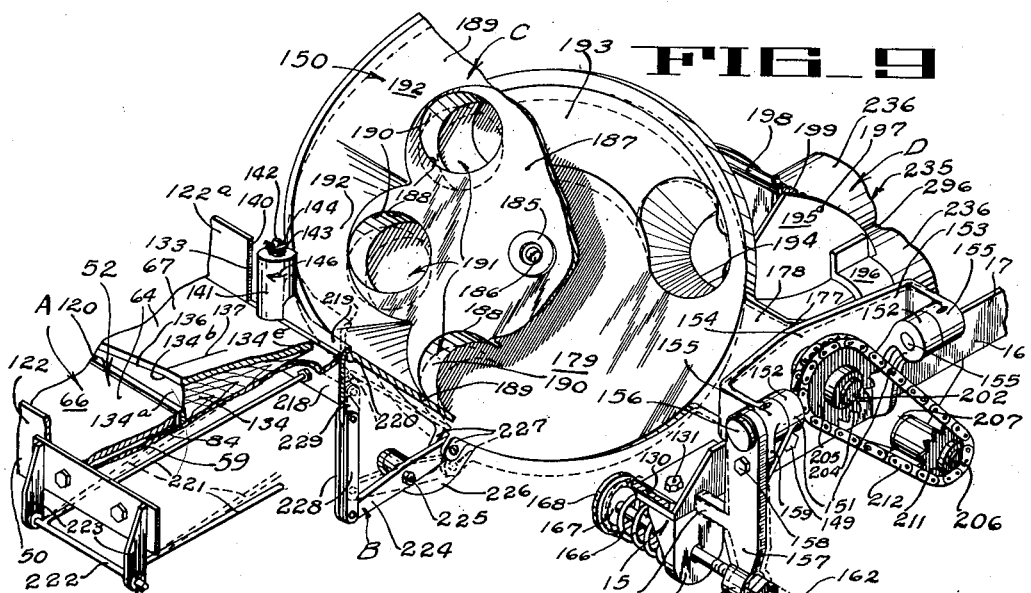
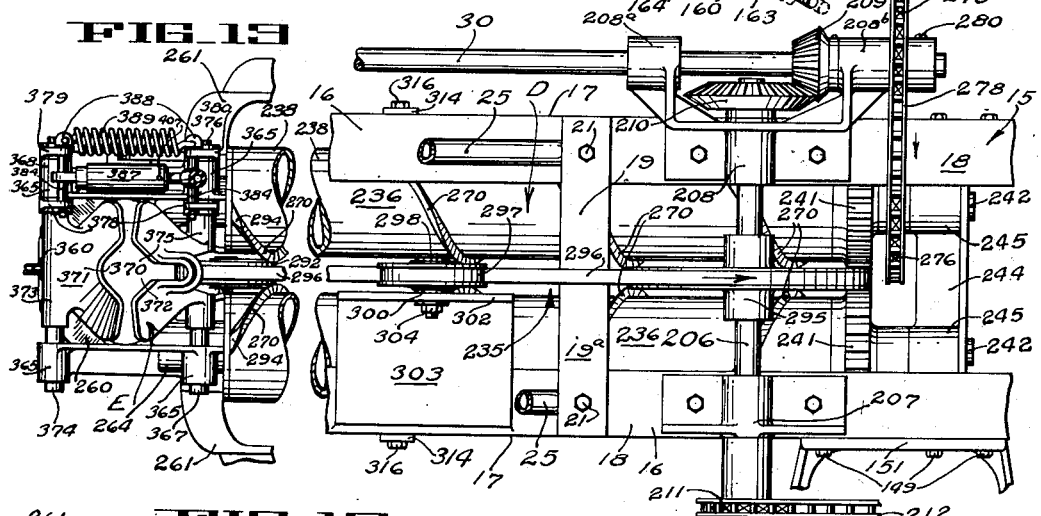
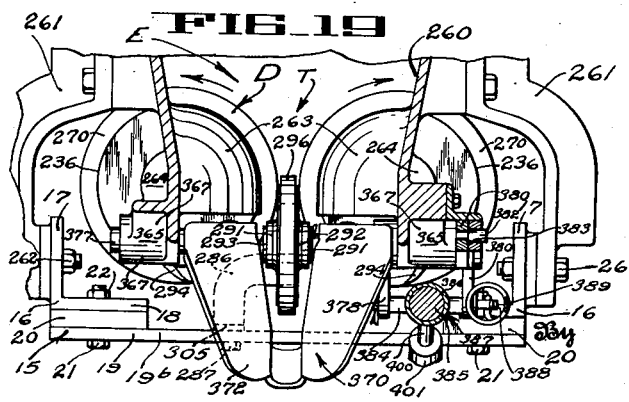
Inventor
ALBERT R. THOMPSON.
Philip G. Minnis
Attorney

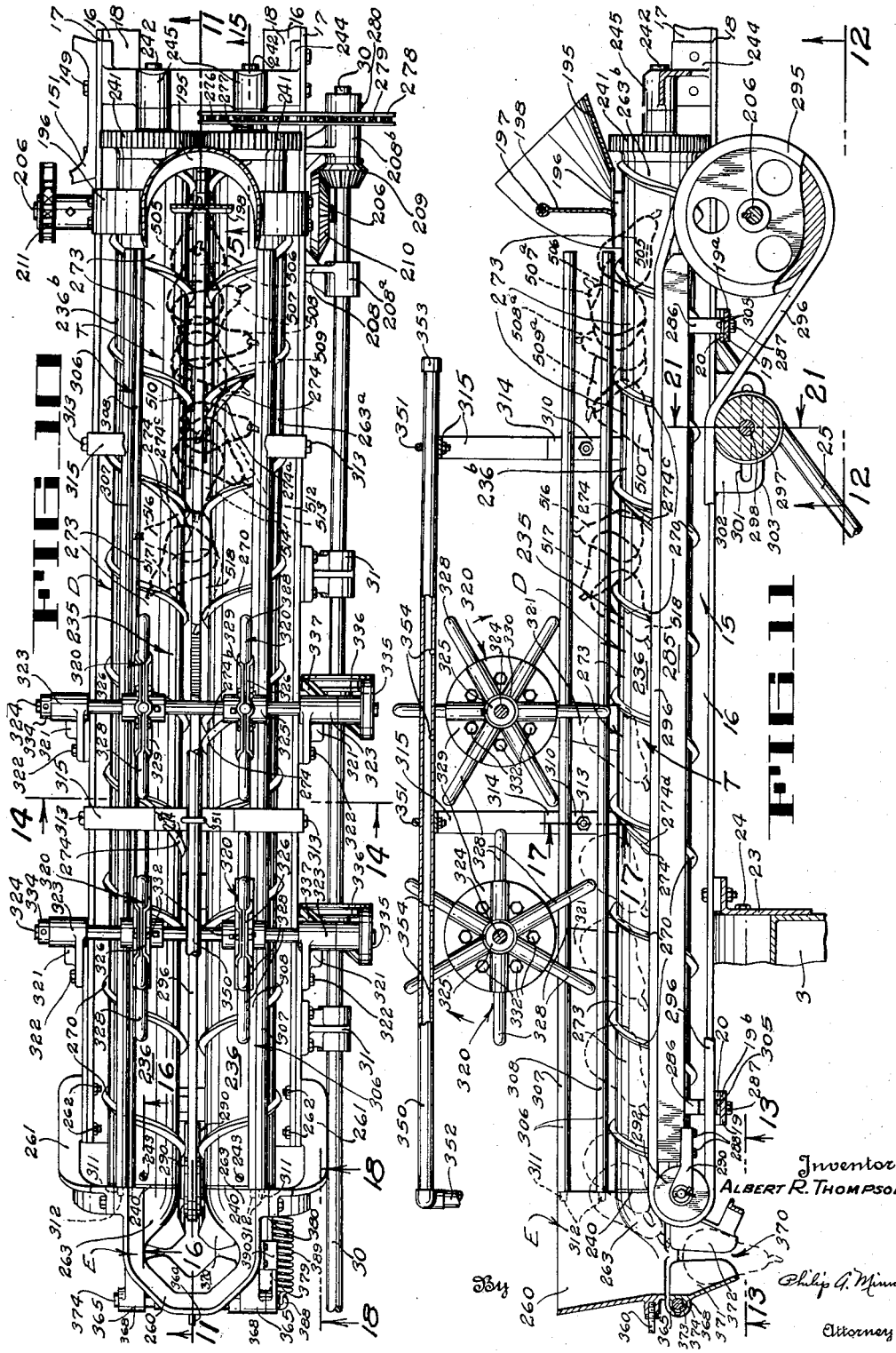

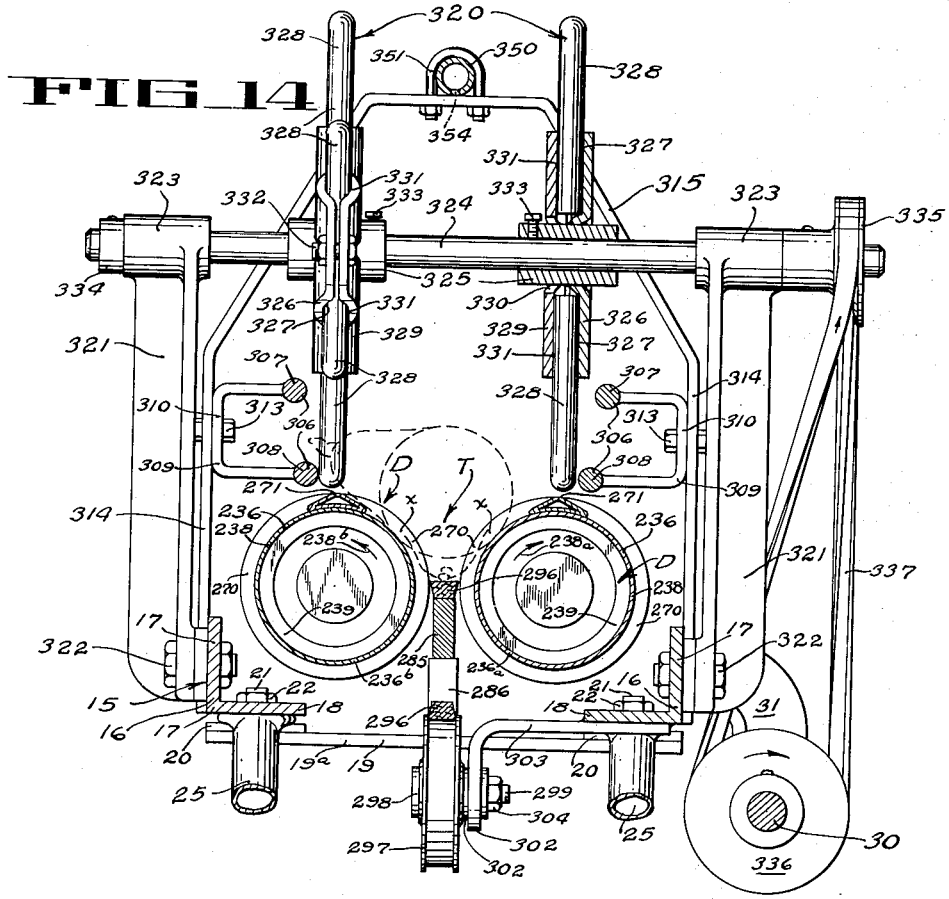
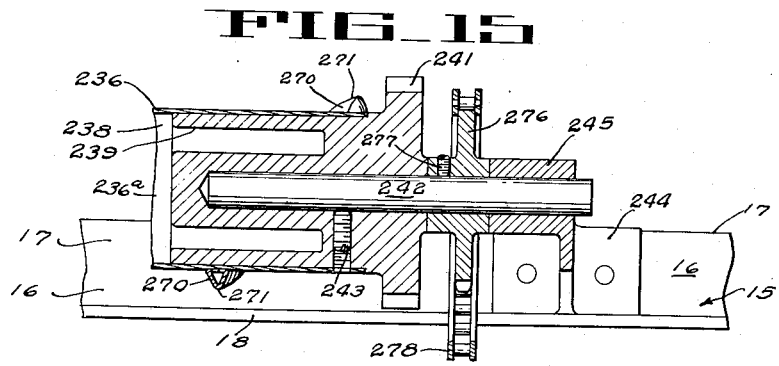

Jan. 8, 1952  A. R. THOMPSON  2,581,732
APPARATUS FOR FEEDING AND ORIENTING PEARS
Filed Jan. 3, 1945  9 Sheets-Sheet 9
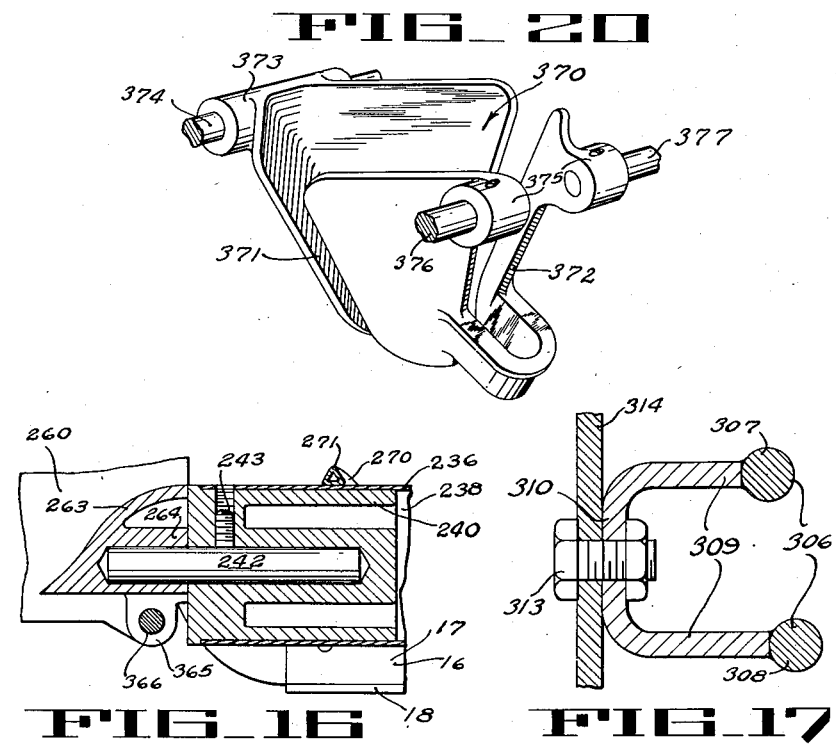
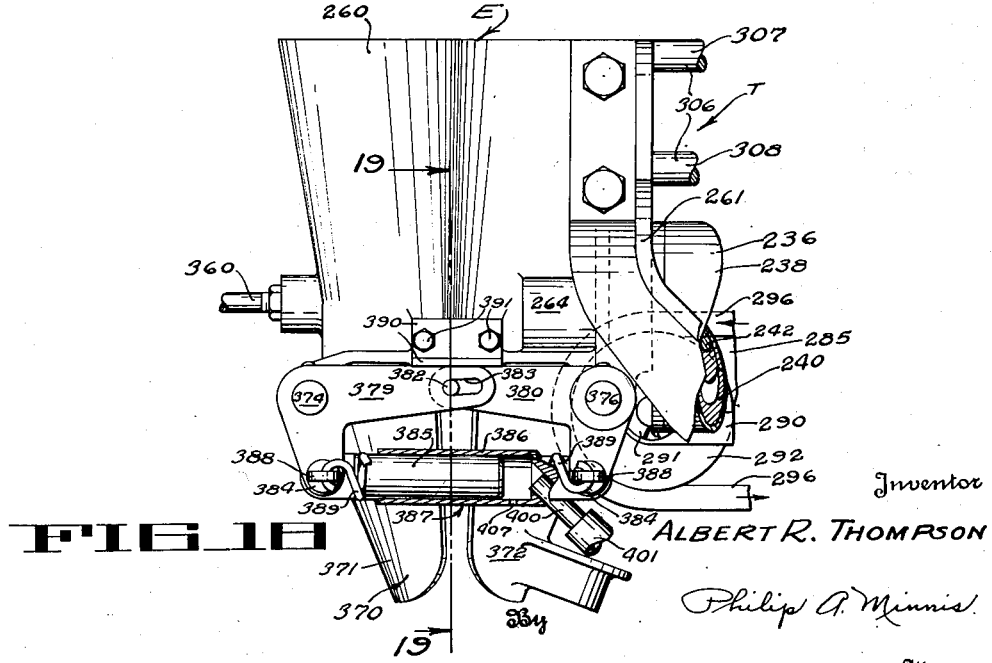
Inventor
ALBERT R. THOMPSON
By Philip A. Minnis
Attorney Patented Jan. 8, 1952

2,581,732

UNITED STATES PATENT OFFICE 2,581,732

APPARATUS FOR FEEDING AND ORIENTING PEARS

Albert R. Thompson, San Jose, Calif., assignor to Food Machinery and Chemical Corporation, a corporation of Delaware Application January 3, 1945, Serial No. 571,146

15 Claims. (Cl. 198—33)

This invention relates generally to the fruit handling art, and is more specifically concerned with the provision of a new and improved apparatus for feeding and orienting pears to a desired place of reception, such as, for example, to the fruit receiving cups of a pear preparation machine.

An illustrative example of a pear preparation machine with which my invention may be employed is partially disclosed in the copending application of F. H. Luhdorff and myself, Ser. No. 523,084, now Patent No. 2,502,797, granted April 4, 1950, filed February 19, 1944, reference being made to my prior Patent No. 2,139,704, dated December 13, 1938, for further details of the machine which were omitted from the drawings of said application for purposes of clarity. Another example of a pear preparation machine with which the present invention may be employed is disclosed in the patent to B. C. Coons No. 2,187,075, dated January 16, 1940.

In the operation of such pear preparation machines it is highly important that the pears be deposited in the feed cups in stem end down position since if otherwise positioned they will not be properly operated upon by the machine and thus result in a loss to the canner. It is also important that the pears be delivered to the feed cups as rapidly as the speed of the preparation machine will permit in order to utilize the full capacity of the machine.

It is the general object of my invention to provide an improved apparatus for orienting and feeding pears to a pear preparation machine or other desired place of reception.

More specifically it is an object to provide such an apparatus which has a large capacity and which is highly effective in delivering the pears in uniform and accurately oriented position.

Various other objects and advantages will become more apparent from the following description taken in connection with the accompanying drawings wherein:

Fig. 1 is a perspective view of the pear feeding and orienting mechanism of the present invention.

Fig. 2 is a plan view of the supply end of the same, certain parts having been omitted.

Fig. 3 is a transverse section of Fig. 2 taken along line 3—3 thereof.

Fig. 4 is a section through a portion of the supply conveyor drive mechanism taken along line 4—4 of Fig. 3.

Fig. 5 is an enlarged vertical section through the supply conveyor and showing the transfer conveyor, the feed control therefor, and a portion of the orienting conveyor in elevation, the view being taken along line 5—5 of Fig. 2.

Fig. 6 is an enlarged section through the supply conveyor and the transfer conveyor taken along line 6—6 of Fig. 2.

Fig. 7 is a view similar to that of Fig. 5, but showing the opposite side of the transfer conveyor and feed control. The view being taken along line 7—7 of Fig. 2.

Fig. 8 is a section taken along line 8—8 of Fig. 7.

Fig. 9 is a perspective view, partly broken away to illustrate the feed control mechanism between the supply conveyor and transfer conveyor.

Fig. 10 is an enlarged plan view of the feeding and orienting conveyor and the timing and discharge mechanism associated therewith.

Fig. 11 is a longitudinal section of the orienting conveyor taken along line 11—11 of Fig. 10.

Fig. 12 is a bottom view of the receiving end of the feeding and orienting conveyor as seen from line 12—12 in Fig. 11.

Fig. 13 is a bottom view of the timing and discharge mechanism as seen from line 13—13 in Fig. 11.

Fig. 14 is an enlarged cross section of the feeding conveyor taken along line 14—14 of Fig. 10.

Fig. 15 is an enlarged sectional detail view of a mount for one end of a conveyor roll taken along line 15—15 in Fig. 10.

Fig. 16 is an enlarged sectional detail of a mount for the opposite end of the conveyor roll taken along line 16—16 of Fig. 10.

Fig. 17 is an enlarged section through a rail bracket taken along line 17—17 of Fig. 11.

Fig. 18 is a side view of the discharge mechanism taken along line 18—18 of Fig. 10, certain parts being broken away while others are shown in section.

Fig. 19 is a transverse section through the timing and discharge mechanism taken along line 19—19 of Fig. 18.

Fig. 20 is an enlarged perspective view of the timing and discharge mechanism of the machine.

Fig. 21 is an enlarged section through the center belt tensioning mechanism taken along line 21—21 in Fig. 11.

Fig. 22 is an enlarged plan view of the center belt pulley and bracket therefore at the discharge end of the machine.

In general the mechanism of the present invention comprises a supply conveyor A, a feed control mechanism B, a rotary transfer conveyor C, a feeding and orienting conveyor D, and a timing and discharge mechanism E.

The pears to be handled are deposited upon the supply conveyor A which supplies the pears to the transfer conveyor C under the control of the feed control mechanism B. The transfer conveyor C feeds the pears received thereby in timed intervals to the feeding and orienting conveyor D which orients the pears and feeds them successively in spaced relation to the timing and discharge mechanism E which discharges the oriented pears to the desired place of reception. For purposes of illustration, the pear feeding and orienting mechanism of the present invention has been shown in connection with a pear preparation machine such as shown in the copending application Serial No. 523,084 above referred to which has as its foundation a frame structure similar to that of the pear peeler shown and described in United States Letters Patent No. 2,139,704. It should be noted, however, that the feeding and orienting mechanism of the present invention may also be used in connection with other types of machines or to deliver pears to any desired place of reception as will be obvious to those skilled in the art.

Preliminary to a more detailed description of the pear feeding and orienting mechanism illustrated, it may be stated briefly that the pear preparation machine with which it is shown associated (Fig. 1) comprises a frame 1 including a turret housing 3 which support for intermittent rotation a turret shaft 4 to which is secured a turret 5 provided with a plurality of stemming tubes 7 upon which pears to be prepared are impaled for intermittent advance as shown and described in Patent No. 2,139,704 hereinbefore mentioned. The shaft 4 is intermittently driven through a Geneva drive (not shown) while a constantly rotating tubular shaft 9 coaxially and rotatably mounted on the shaft 4 is suitably driven by the prime mover of the machine (not shown) as clearly shown in Patent No. 2,139,704 previously referred to herein.

*Frame structure and drive*

Independent drive means may be employed for driving the pear feeding and orienting mechanism of the present invention. However, since it is intended to operate in synchronism with a pear preparation machine, it is preferably driven directly by the pear preparation machine with which it is associated.

The pear feeding and orienting mechanism comprises a frame structure 15 (Figs. 1, 10, 11, 12, and 14) including a pair of angle irons 16 having the flanges 17 thereof arranged vertically to form upstanding outer edges of the frame and their other flanges 18 arranged horizontally and facing inwardly toward each other. The angles are arranged parallel to each other and are spaced from each other by cross straps 19. Pillow blocks 20 are arranged between the flanges 18 and the ends of the straps 19, and bolts 21 extend through the straps, blocks, and flanges which are secured together tightly by threading a nut 22 upon each bolt. Bolted to the bottom flanges 18 at a point adjacent the pear preparation machine is a bracket 23 which is bolted as at 24 to the turret housing 3, see Fig. 11. The opposite end of the frame structure 15 is braced by struts 25 having their lower ends (not shown) suitably bolted to frame 1 of the pear preparation machine and their upper ends bolted conjointly with the strap 19a to the angles 16.

A drive shaft 30 is rotatably arranged in aligned bearing brackets 31 bolted to the upstanding flanges 17 on one side of the frame 15 and the forward end of this shaft is journaled in a bearing 32 formed on a bracket 33 bolted as at 34 on the frame 1 of the pear preparation machine. Secured to the shaft 30 adjacent the bracket 33 is a sprocket 35 which is drivingly connected by a chain 36 to a sprocket 37 secured to the constantly rotating tubular shaft 9. An idler sprocket 38 is rotatably mounted on a stud shaft 39 extending through a slot 40 in the web portion 41 of the bracket 33 and secured to the web portion at the desired position to tension the chain 36. From the foregoing it is therefore apparent that upon operation of the pear preparation machine, i. e., rotation of the shaft 9, the drive shaft 30 is constantly rotated in timed relation therewith.

*Supply conveyor*

The supply conveyor A (Figs. 1 to 3 and 5 to 7) comprises a frame 50 having legs 51 for supporting a table 52 formed by a channel member 59 supported on cross beams 60 welded to the upper ends of the legs 51. The lower ends of the legs are joined by longitudinal struts 61 and cross bars 62 secured to the legs as by welding. Arranged on the frame 50 are a set of pulleys over which conveyor belts 64 disposed adjacent each other are trained, there being two such belts 66 and 67 movable in opposite directions and in a common plane relative to each other. The belt 66 is trained over one set of pulleys 68 and 69 while the other belt 67 is trained over a different set of pulleys 70 and 71.

The pulleys 68 and 70 are each mounted for free rotation on a shaft 72 supported on brackets 73 secured to the legs 51 at one end of the frame 50 (see Figs. 1, 2, and 3), while the pulleys 69 and 71 are secured to separate drive shafts 74 and 75, respectively, which drive shafts 74 and 75 are arranged in spaced relation and journaled in bearings 80 and 81 mounted by bolts 82 on a U-shaped bracket 83 suitably secured to the legs 51 at the opposite end of the frame 50.

The pulleys are so arranged that the upper reaches of the belts are disposed adjacent each other and extend in a common plane over the bottom wall or web of channel 59. A number of oval shaped strips 84 (Fig. 2) are arranged in spaced relation on the web of the channel 59 to support the belts 66 and 67 above the latter and minimize frictional engagement between the table and belts as the belts travel over the table.

Each belt 66 and 67 has its slack suitably taken up by an idler roller 86 and 87, respectively. The idler rollers 86 and 87 are mounted on an idler shaft 88 which is supported in bearings 92 adjustably mounted on the adjacent legs 51 by bolts 94 extending through vertical slots 96 formed in the legs (Figs. 3 and 5). Suitable retaining collars 97 are secured to the end of the idler shaft 88 to prevent lateral shifting of the shaft relative to the bearings 92.

Adjacent ends of the drive shafts 74 and 75 have spur gears 100 and 101 secured thereto and intermeshing with each other so that the shafts 74 and 75 will rotate in opposite directions. As best seen in Figs. 2 and 4, the drive shaft 74 has a large gear 102 secured to its opposite end and this large gear meshes with a pinion gear 103 provided with a sleeve portion 104 and arranged for free rotation on the adjacent end of the drive shaft 75. A drive pulley 105 is pressed onto and keyed to the sleeve portion 104 for rotation therewith and is retained on the shaft 75 by a collar 106 secured to the end of the shaft by a set screw. A V-belt 107 is trained over the drive pulley 105 and over a motor pulley 108 secured to a drive shaft 109 of a gear reduction unit associated with an electric motor 110.

The motor 110 is adjustably mounted on a motor base 111 by bolts 112 extending through slots 113 formed in the base 111. This base is welded to a pair of obliquely disposed braces 114 having their respective ends secured to the legs 51 and the struts 61 (Fig. 3). The motor base 111 is in a plane substantially parallel to a plane extending from the center of the drive pulley 105 to the center of the drive shaft 109 associated with the motor 110.

A tensioning screw 116 is threadably mounted in a nut 117 welded on an upstanding flange 118 of the motor base 111 in such a manner that the end of the tensioning screw bears against the motor for urging the motor and gear reduction unit in a direction away from the drive pulley 105 to thereby tighten the V-belt 107.

As seen in Figs. 1, 2 and 3, the motor 110 drives the pulleys 108 and 105 clockwise to rotate the pinion gear 103 in a similar direction thereby driving the large gear 102 and shaft 74 counterclockwise. The spur gear 100 rotating with shaft 74 drives the spur gear 101 and shaft 75 clockwise thereby rotating the pulleys 69 and 71 in opposite directions to cause the upper run of the belt 67 to travel toward the right, Figs. 1 and 2, and the upper run of the belt 66 to travel toward the left.

The table 52 has a center rib 120 which extends upwardly from the web portion of the channel 59 between the upper reaches of the belts 66 and 67 to separate them and to provide a slight ridge between them. The table 52 is further provided with end walls 121 and 121a. The end wall 121 extends over both belts 66 and 67 and is secured to upstanding flanges 122 and 122a of the channel 59 which constitute the side walls of the table, while the end wall 121a extends only over the belt 66 and is secured to the side wall 122 and a center partition 121c which forms in conjunction with the side wall 122a an inlet passage 121d. The end walls 121 and 121a are spaced slightly above the top surface of the belts 66 and 67 to permit free movement of the belts along the table and to prevent the stems of the pears from becoming pinched between the belts and the walls 121.

Each of the end walls 121 is curved and merges with the side wall of the table adjacent the upper run of the oncoming belt in such manner that articles carried by the belt moving toward the end wall will be diverted therefrom upon the other belt which is traveling away from the particular end wall referred to. The portion of each of the belts 66 and 67 approaching one or the other arcuate end wall is slightly elevated by a tapered shim strip 123 (Fig. 2) arranged on the web portion of the channel 59 and having its apex disposed adjacent the side wall 122 or 122a, respectively, so that the portion of the upper run of each belt approaching the curved wall 121 or 121a is raised to the same elevation as the upper edge of the center rib and is slightly tilted toward the reach of the adjacent belt to thereby assist the curved end walls in deflecting the pears over the central rib 120 upon the other belt. The arrangement is such that when pears are deposited at the inlet 121d upon the belt 67 and the belts are in motion, the pears are advanced by the belt 67 in the direction of arrow 67a along the side wall 122a until deflected over onto the belt 66 by the curved end wall 121 whereupon they are advanced in the direction of arrow 66a along the other side wall 122 until they are deflected back onto the belt 67 by the curved end wall 121a.

It is to be understood that a plurality of transfer conveyors C and feeding conveyors D may be associated with the supply conveyor A on either side thereof although in the present instance only one transfer conveyor and one feeding and orienting conveyor have been illustrated in association therewith. In arranging the table 52 relative to the feeding and orienting conveyor as well as the transfer conveyor C the table is secured to one angle 16 of the frame 15 by a bracket 130 (Figs. 2, 5, and 6) having one end bolted as at 131 to the bottom flange 18 of the channel 16 and its opposite end bolted as at 132 to the underside of the table to dispose the transfer conveyor C at the desired position adjacent one side wall 122a of the table. The side wall 122a adjacent the transfer conveyor is provided with a discharge opening 133 which is disposed to permit the discharge of pears from the supply conveyor into the transfer conveyor.

Positioned between the upper run of the belt 67 and the web or bottom of the channel 59 intermediate the side wall 122a and the center rib 120 is a block 134. The side 134a of the block 134 adjacent the center rib 120 is of triangular configuration with the apex of the triangle disposed at 134b. The front and rear edges 134c and 134d of the block as well as the side edge 134e adjacent the side wall 122a of the table 52 are disposed substantially at the same elevation as the surface of the web of the channel 59 while the top surfaces 135 and 136 of the block are upwardly inclined toward each other and toward the triangular side 134a forming a ridge 137 at their junction extending in upwardly inclined direction from the side edge 134e to the apex 134b of the triangular side transversely of the block. The block 134 is so positioned on the channel 59 that the ridge 137 is disposed adjacent the right hand margin of the discharge opening 133 as seen in Figs. 1 and 2.

From the above it will, therefore, be seen that the upper run of the belt 67 is pitched toward the discharge opening 133 as the belt travels past the same over the block 134 so that the pears conveyed by the belt 67 are urged toward the side wall 122a of the table as they approach the discharge opening 133 for discharge therethrough into the transfer conveyor C. Pears on the belt 67 that do not pass through the opening 133 by reason of a pile up of pears at the opening or by reason of closing of the opening 133 by the feed control mechanism B in a manner later to be explained, will be conveyed beyond the opening and over the ridge line 137 for another routing around the table 52.

Positioned adjacent the edge 140 (Figs. 1, 2, 7, and 9) of the discharge opening 133 is a roller 141 rotatably mounted on a rod 142, the lower end of which is welded to the side wall 122a. The roller 141 is so positioned that its lower end rests upon the belt 67 while a coil spring 143, intermediate the upper end of the roller and a washer 144 held on the rod 142 by a cotter pin 145, maintains the roller in frictional engagement with the belt 67 so that upon movement of the same the roller 141 is rotated in the direction of arrow 146. The roller 141 facilitates the discharge of pears through the opening 133 and prevents lodging of the pears at the edge 140 of the side rail 122a adjacent the opening 133.

*Transfer conveyor*

The transfer conveyor C constitutes a rotatable hopper 150 arranged between the supply conveyor A and the feeding and orienting conveyor D for receiving pears passing through the discharge opening 133 to segregate them from the promiscuous mass of pears on the table 52 and for separating the segregated pears for delivery one at a time to the feeding and orienting conveyor.

The hopper 150 (Figs. 7 and 9) is arranged at the front end of the frame 15 on a bracket 151 bolted as at 149 to one angle iron 16. The bracket 151 has a pair of spaced bearings 152 aligned with respect to each other outside the frame 15 (see Figs. 2, 7, 8, and 9).

A mounting yoke 153 having a central web 154 with aligned boss formations 155 at its outer ends straddling the aligned bearings 152 is pivotally mounted on the bracket 151 by stud pins 156 secured to the respective boss formations 155 and extending into the respective bearings 152 to support the mounting yoke 154 for pivotal movement relative to the bracket 151.

Associated with one of the boss formations 155 is a balancing arm 157 having its upper end mounted on the stud pin 156 of the boss formation and secured by bolt 158 to an arm 159 extending downward from the particular boss formation 155 referred to and foming an integral part thereof. The lower end of the balancing arm has a boss formation 160 provided with a bushing 161 to receive the threaded end of a stem 162 upon which lock nuts 163 are threaded. The stem 162 extends through a stationary guide bracket 164 suspended from the frame 15 and having a socket 165 in which one end of a compression spring 166 is seated the opposite end of which is centered concentrically with respect to the stem by a shoulder 167 formed on a head plate 168 secured to the end of the stem. The compression spring 166 urges the balancing arm 157 and the mounting yoke 153 counterclockwise in Fig. 8 or clockwise in Fig. 9 and a stop lug 169 (Fig. 9) formed on the balancing arm engages the adjacent angle 16 to limit such movement.

The web 154 of the mounting yoke 153 has a bearing boss 175 (Fig. 8) formed thereon. Mounted on this bearing boss 175 and bolted as at 176 to the web 154 is a depending bracket 177 of a hopper carriage 178. The hopper carriage has a substantially circular plate portion 179 disposed at an angle relative to the supply conveyor A to position the lower periphery of the circular plate adjacent to and below the discharge opening of the supply conveyor and the upper periphery of the circular plate above the receiving end of the feeding and orienting conveyor D (Figs. 5 to 9 inclusive).

As best seen in Fig. 6, a hub 180 is formed concentrically on the plate portion 179 through which a shaft portion 181 of a bevel gear 182 extends. The hopper also has a hub portion 183 which rests on a thrust bearing 184 lying on the hub 180 of the carriage 178 and this hub portion 183 is secured to the shaft 181 by a cap plug 185 having a set screw 186 threaded therethrough and into the upper end of the shaft portion 181.

The hopper 150 has a bottom wall 187 (Figs. 2, 6, and 9) spaced from the plate 179 and provided with a series of apertures 188 at radial points therearound and adjacent an annular side wall 189 extending upwardly from the bottom wall of the hopper. Extending downwardly from the bottom wall 187 coaxially with the apertures 188 are a series of integral tubular sections 190 which form transfer pockets 191 in the hopper, the size of each pocket being such as to hold one pear only for transfer. The side wall 189 of the hopper is formed to provide a recess 192 adjacent each pocket 191 for guiding the pears into the pockets. The plate 179 provides a stationary bottom for the pockets 191 to support the pears in the latter during transfer from the discharge opening 133 to a point above the feeding and orienting conveyor D where they are to be dropped one at a time into the latter.

The plate 179 is depressed slightly adjacent the upper periphery of the carriage to form a gradually declining chute 193 relative to the path of travel of pears confined in the pockets 191. The chute 193 terminates in a discharge opening 194 formed in the plate 179 above the longitudinal axis of the frame 15. The depressed chute portion 193 permits pre-gravitation of the pears relative to the pockets 191 while the hopper is in motion to assure a complete discharge of a pear from a pocket as it passes over the opening 194 and the falling pears are guided by a chute 195 into the feeding and orienting mechanism D. This chute 195 is supported on brackets 196 extending downwardly therefrom and bolted to the side flanges 17 of the frame 15.

Pivotally mounted on a rod 197 mounted within the chute 195 is flap 198 which hangs downwardly into the path of the pears and is slightly restrained against forward movement by a light spring 199 to reduce the momentum of the pears discharging from the chute 195.

The bevel gear 182 which is rotatable with the hopper meshes with a bevel gear 201 (Fig. 8) secured to a shaft 202 journaled in a bushing 203 formed on the lower surface of the plate 179 and the aforementioned bearing boss 175 on the mounting yoke 153 whereby the shaft 202 will move with the carriage 178 relative to the pivotal mounting thereof on the bracket 151. The free end portion 204 of the shaft 202 is disposed between the aligned bearings 152 of the yoke 153 and has a sprocket 205 secured thereto (Figs. 7, 8, and 9).

As seen in Figs. 1, 3, and 12, a cross shaft 206 is rotatably mounted on a pair of bearing brackets 207 and 208 bolted to respective angles on each side of the frame 15. The bracket 208 has a pair of spaced bearings 208a and 208b formed thereon for supporting the drive shaft 30 hereinbefore referred to. A bevel gear 209 is secured to the drive shaft 30 and meshes with a bevel gear 210 secured to the cross shaft 206 to rotate the latter counterclockwise as seen in Figs. 5 and 6. A sprocket wheel 211 is secured to the opposite end of the cross shaft 206, Figs. 7 and 9, and is drivingly connected to the sprocket 205 by a chain 212. It should be noted that the center of the sprocket wheel 205 is disposed on the pivot axis of the yoke 153 so that slight tilting of the sprocket 205, its shaft 202 and hopper carriage 178 is permissible without disturbing the driving relation between the two sprockets.

It is, therefore, apparent that the hopper 150 will be constantly rotated in a clockwise direction as seen in Fig. 2 so that pears not lodged in the pockets, but lying above the pears in the pockets, will roll back down the inclined bottom of the hopper until each individual pear becomes lodged in one of the pockets. It is also apparent that the drive connection between the hopper 150 and the drive shaft 30 synchronizes the transfer conveyor with the pear preparation machine to transfer one pocket 191 into registration with the discharge opening 194 upon each intermittent operation of the turret 5.

Feed control mechanism

The feed control mechanism B constitutes a cut-off device whereby the flow of pears from the supply conveyor A to the transfer conveyor C is interrupted after a number of pears have been received in the latter.

The cut-off device best seen in Figs. 5, 6, 7, and 9 comprises a gate 218 arranged for vertical movement to closed and open position relative to the discharge opening 133. The gate 218 has a curved upper flange 219 adapted to lie upon the rim portion 220 of the side wall 189 of the hopper to permit the pears to gravitate from the inclined belt 67 into the lowermost region of the inclined hopper 150.

The gate 218 is shown secured to the ends of parallel rods 221 which extend beneath the channel 59 and have their opposite ends welded to a shaft 222 pivotally mounted between brackets 223 depending from and secured to the side wall 122 of the channel 59 farthest removed from the hopper. The rods in swinging toward and away from the table 52 guide the gate 218 for substantially vertical movement relative to the discharge opening 133.

A rocker arm 224 is pivotally mounted at 225 on a stationary bracket 226 extending from the frame 15 (Fig. 7). The hopper plate 179 has a pair of depending lugs 227 at its lowermost periphery which lugs straddle the end of the shorter lever of the rocker arm 224 and are pivotally connected thereto while the opposite end of the rocker arm is pivotally connected to the lower ends of straddle bars 228 having their upper ends pivotally connected to a lug 229 extending downwardly from the gate 218 thereby operatively connecting the gate to the counterbalanced hopper carriage 178.

The hopper carriage 178 is so balanced by the compression spring 166 that it will normally support approximately six to eight pears, but upon discharge of about four additional pears into the hopper the total weight of the pears will weigh down the hopper carriage and compress the spring 166 thereby tilting the hopper carriage into a lowermost position as seen in dotted lines in Fig. 9 whereupon the rocker arm 224 will be rocked to lower the shorter lever thereof and raise its opposite end to lift the gate 218 to closed position relative to the discharge opening 133 thereby temporarily obstructing the flow of pears from the supply conveyor A until the weight of the pears in the hopper 150 is reduced by the successive discharge of pears therefrom into the feeding and orienting conveyor D. After a number of pears (four to five) have been discharged from the hopper the spring 166 will raise the hopper carriage to lift the shorter lever of the rocker arm 224 thereby lowering the gate 218 to permit the entrance of four or five more pears into the hopper 150. The load bearing capacity of the compression spring 166 may be varied by adjusting the lock nuts 163 on the stem 162 so that the hopper will tilt upon the discharge of a greater or lesser number of pears thereinto as desired.

In this manner, the amount of pears discharged from the supply conveyor A into the transfer conveyor C is so controlled as to prevent congestion therein and to permit tumbling of the pears over already filled pockets 191 into successive empty pockets as they elevate from beneath the discharge opening 133 to a point above the discharge opening 194 during rotation of the transfer conveyor C.

Feeding and orienting conveyor

The feeding and orienting conveyor D constitutes a screw feed 235 formed by a pair of substantially horizontally disposed spaced conveyor screws 236 extending lengthwise of the frame 15 as shown in Figs. 10 to 14 inclusive.

The screws 236 are supported in spaced relation as shown in Fig. 14 to form a trough T for supporting pears discharged from the transfer conveyor C, for orienting them and for conveying the same in oriented condition to the timing and discharge mechanism E.

Each screw comprises a tubular section or roll 238 having a sleeve cap 239 pressed into and sweated onto its receiving end, as seen in Fig. 15, and a sleeve cap 240 pressed into and sweated onto its discharge end, as seen in Fig. 16. Each sleeve cap 239 has a spur gear 241 formed thereon and adapted to mesh with each other for rotating the tubular sections in opposite directions. Each of the sleeve caps 239 and 240 has a spindle 242 secured thereto by set screws 243. The spindles 242 of each conveyor screw are axially aligned with the tubular section thereof.

The frame 15 (Figs. 10, 18, and 19) is provided with a bracket 244 bolted adjacent the front end thereof beneath the transfer conveyor. This bracket has a pair of bushings 245 in which the respective spindles 242 extending from the sleeve caps 239 are rotatably mounted to support the receiving end of the conveyor screws on the frame. The opposite end of the frame is provided with a U-shaped hopper 260 bolted to the upper ends of bracket arms 261, the lower ends of the bracket arms are bolted as at 262 to the ends of the upstanding flanges 17 of the frame 15. This U-shaped hopper 260 is provided with a pair of rounded block formations 263 having bushings 264, Fig. 16, for rotatably supporting the spindle shafts 242 extending from the sleeve caps 240 adjacent the timing and discharge mechanism E. As seen in Figs. 10, 11, 16, and 19, the upper surfaces of these block formations 263 are aligned with the ends of the tubular sections or rolls 238 and are of a contour which molds into the hopper formation so that the block formations cooperate with the side walls of the hopper to guide the pears from a substantially horizontal to a vertical position as will later become apparent.

Each of the tubular sections or rolls 238 is provided with a spirally trending thread 270. The threads 270 may be formed integrally with the constituent parts of the conveyor or feed screws 236 as by molding or cutting a thread into stock having substantially the form of the feed screws. However, in forming each screw the spiral thread is preferably applied by winding a helically trending bead 271 about the tubular section 238. This bead may be made from continuous tubing rolled to the form of an isosceles triangle in cross section as seen in Figs. 15 and 16. The base of each helically trending triangular shaped thread is soldered or otherwise secured to the tubular section associated therewith.

Each spiral thread commences at the front or fruit receiving end of its respective tubular section adjacent the spur gear 241 and is wound about the tubular section or roll in equally spaced convolutions to the discharge end of the same to space the pears equally from each other as they are fed along the trough T. The spacing between the convolutions of the thread of each conveyor screw is greater than the length of the largest pears to be handled by the machine.

The spiral threads 270 on the two rolls are oppositely convoluted (Fig. 10) and are so disposed and aligned relative to each other transversely of the trough as to form a plurality of pockets 273 therein traveling from the receiving to the discharge end of the rolls upon rotation thereof in opposite directions, i. e., in the directions as indicated by arrows 238a and 238b in Fig. 14. Each of these pockets is adapted to receive and advance a single pear only and is of sufficient length to accommodate the pear lengthwise therein. The threads of the rolls are convoluted in such a manner that the thread portions in the trough at the rear end of each pocket present a pair of transversely aligned surfaces inclined toward the receiving end of the rolls for engaging the pear in the pocket at transversely opposite points X—X (Fig. 14) in the trough for urging the pear along the same with upward and forward thrusts causing the pear, in conjunction with the action of the rolls thereon, to roll forward and turn sidewise, in clockwise or counterclockwise direction, during its travel until its stem end is disposed in leading position in the pocket and is advanced in this position along the trough toward the discharge end of the same.

From the above it will, therefore, be seen that the pears haphazardly dropped upon the screws at the receiving end thereof, with a single pear disposed in each pocket, are advanced in a single file and in spaced relation toward the discharge end of the screws and are oriented incident to their travel along the trough.

The altitude of the triangular shaped tubing or bead 271 is sufficiently high to prevent a fallback of the pears into the next successive pocket thereby assuring against the posibility of a pocket becoming unoccupied prior to its arrival at the timing and discharge mechanism E or the possibility of a pocket arriving thereat with two pears for a single discharge.

At alternate points along the trough the spiral threads 270 are provided with accelerated lead portions 274 disposed in staggered relation with respect to each other. These lead portions branch out from the normal thread at an increased pitch relative thereto. The first of such lead portions to be encountered by an advancing pear preferably branches from the spiral thread on one screw at about its second convolution from the receiving end of the trough while the next or alternate lead portion branches from the spiral thread on the opposite screw at approximately the third or next successive convolution from the receiving end of the trough. Another such set of lead portions is formed on the screw feed approximately midway between the ends of the trough.

As the screws rotate upwardly and outwardly relative to the trough, the lead portions 274 sweep from below against the bulb portion of the pears with an accelerated action as compared with the normal pitch of the threads 270 by reason of the fact that the lead portions are arranged at an increased pitch with respect thereto.

By this arrangement pears deposited upon the conveyor screws 236 by the transfer conveyor C and advanced along the trough with their stem blossom axes remaining laterally disposed relative to the trough are subjected to a sudden upward and forward thrust or kick at one side thereof by reason of the accelerated advance of the lead portions 274 engaging one side of the bulb portion of the pears. Referring to Fig. 10 the thrust effected by the first lead portion 274a of one of the screws 236a will tend to turn a pear clockwise in the manner as illustrated in sequence by the pears shown in dotted lines at 512 to 514 in Fig. 10, while the thrust of the second lead portion 274c will tend to swing a pear counterclockwise as is illustrated in sequence by the pears shown in dotted lines at 516 and 518 in Fig. 11. Consequently, dependent upon the directional disposition of the pears, those with their neck end portions lying on the feed screw 236a will be turned clockwise while those with their neck ends lying on the opposite screw 236b will be turned counterclockwise whereby the neck ends of such pears are swung forwardly into leading position in the trough T formed by the two screws. The alternate lead portions 274b and 274d further down the trough will have the same effect on any pear that might be disposed to receive an accelerated thrust from them in the same manner as described with respect to the first pair of lead portions.

It is obvious that the same result may be obtained by increasing the pitch of the spiral threads 270 at alternate points along the trough so that certain convolutions of the thread portions are offset relative to each other transversely of the trough at desired points therealong whereby the pears are turned sidewise in one or the opposite direction in the same manner and for the same purpose as explained above regarding the lead portions 274.

As best seen in Figs. 10 and 15, the spindle shaft 242 at the receiving end of the trough and adjacent the drive shaft 30 has a sprocket 276 secured thereto by a set screw 277. A chain 278 is trained around the sprocket 276 and a sprocket 279, secured by set screw 280 to the adjacent end of the drive shaft 30, to rotate the screw 236a in an upward and outward direction relative to the trough as indicated by arrow 238a in Fig. 14 and, consequently, through spur gears 241, to rotate the other screw 236b in an opposite direction, i. e., in the direction indicated by arrow 238b in Fig. 14. The speed of rotation of the twin screws 236 is thereby synchronized with the operation of the pear preparation machine so as to rotate the screws one revolution incident to each intermittent operation of the Geneva drive to feed one pear into the timing and discharge mechanism E upon each intermittent operation of the turret 5. Since both the screw feed and the transfer conveyor are driven from the common drive shaft 30 in synchronism with the intermittent operation of the turret 5, it is apparent that they are in synchronism with each other so that one pear is discharged through the discharge opening 194 upon each revolution of the screw feed 235 when the first pocket 273 thereof is in fruit receiving position beneath the chute 195.

A center rail 285 is arranged in the space between the two screws 236 on legs 286 resting on the cross straps 19 and secured thereto by bolts 287 as seen in Fig. 11. Secured to the discharge end of the center rail by bolts 288 is a channel shaped end 289 of a yoke 290, also shown in Fig. 22. The spaced arms of the yoke 290 are provided with aligned bearings 291 between which a discharge pulley 292 is disposed for rotation on a shaft 293 suitably journaled in the bearings 291. The upper edges 290a of the spaced arms of yoke 290 are disposed at an angle relative to horizontal and as seen in Figs. 13 and 19 the spiral threads 270 have their discharge ends tapered off at an angle as at 294 to extend substantially parallel to the upper edges of the respective yoke arms when the tapered ends 294 are disposed adjacent the same, the yoke 290 being so disposed relative to the screws 236a and 236b to provide a sufficient clearance between the upper edges 290a of the yoke arms and the tapered ends 294 of the threads to permit free rotation of the screws.

A drive pulley 295 is keyed to the cross shaft 206, hereinbefore referred to in connection with the drive mechanism for the transfer conveyor C, for rotation in a plane substantially aligned with the center rail 285. Trained around the two pulleys 292 and 295 is a center belt 296 having its upper reach extending from the upper periphery of the drive pulley 295 to ride along the top surface of the center rail 285 and around the discharge pulley 292. The lower reach of the belt 296 is trained through a passage formed by the offset leg 286 on the cross strap 19b and over the bracket 23 as well as over a tensioning pulley 297 and thence around the drive pulley 295.

The tensioning pulley 297, Figs. 11, 14, and 21, is rotatably arranged on a headed stud shaft 298 having a reduced portion 299 on which is arranged a washer 300. The reduced portion is threaded and extends through a horizontal slot 301, formed in the depending flange 302 of a bracket 303 welded to the adjacent flange 18 of the frame 15. A nut 304 is threaded on the reduced portion 299 to secure the stud shaft 298 and pulley 297 in a proper position to tension the belt 296.

The upper reach of the center belt 296 is supported by the center rail 285 at such an elevation relative to the spaced screws 236 as to engage the stem or the neck portion of a pear disposed lengthwise within the trough and the center rail may be raised or lowered, as desired, by applying or removing washers 305 from the bolts 287 between the straps 19 and legs 286 as will be obvious to those skilled in the art.

The drive pulley 295 is so dimensioned as to drive the center belt at a greater speed than the normal rate of advance of the pears by the screw feed so as to produce a constant forward drag on the leading stem ends of pears and prevent detention thereof at any point along the trough sufficiently long to form a fulcrum since, otherwise, the bulb portion of a pear may swing over the stem end thereof.

Each side of the trough T is provided with a side rail 306 each comprising a pair of parallel rods 307 and 308 supported in spaced relation on the ends of lower and upper legs, respectively, by laterally disposed U-shaped brackets 309. The upper legs of the brackets 309 are shorter than the lower legs thereof to dispose the lower rods 308 further away from the bight portions 310 of the brackets than the upper rods 307. The ends 311 of the rods 307 and 308 adjacent the timing and discharge mechanism E are reduced to fit into sockets 312 formed in the abutting face of the aforementioned U-shaped hopper 260 as seen in dotted lines in Figs. 10 and 11. The bight portions 310 of the brackets 309 are secured by bolts 313 to vertical legs 314 of overhead bows 315 bolted as at 316 to the side flanges 17 of the frame 15. As seen in Fig. 14, the rails 306 are flared upwardly and outwardly from the point outside the longitudinal axes of adjacent screws 236 to prevent pears from hopping out of the trough and are open by reason of the space between the rods so as to permit the stems of pears to swing freely between them without binding or catching of the neck portions of the pears thereon.

The discharge half of the trough is provided with two pairs of pear engaging star wheels generally indicated by reference numeral 320 which are employed for the purpose of assuring that all pears, upon arriving at the discharge end of the twin screws, will be discharged therefrom stem end first.

All of the star wheels and their associated parts are identical as seen in Figs. 10, 11, and 14, and, therefore, like reference numerals, will indicate like parts thereof. The support for each pair or set of star wheels comprises a pair of brackets 321 secured by bolts 322 to the outside flanges 17 of the frame 15. Each pair of brackets have aligned bearings 323 at their upper ends for rotatably supporting a cross shaft 324 above the trough. Two star wheels are arranged in spaced relation adjacent each other and are secured to each cross shaft for rotation therewith. Each wheel consists of a hub 325 having a disc portion 326 formed concentric relative to the hub. A series of equally spaced semi-tubular radially extending recesses 327 are formed on the disc 326 to receive a series of rods or flexible rubber fingers 328 radially disposed with respect to the hub portion 325.

A complementary disc 329 having a central opening 330 to fit over the hub 325 has a series of corresponding semi-tubular recesses 331 to embrace the rods 328. The disc 329 is secured to the disc 326 by bolts 332 to grip the rods in vise-like fashion. Each star wheel is so disposed on its respective cross shaft 324 that it rotates in a plane substantially above the longitudinal axis of a respective feed screw 236 and is secured to the cross shaft by a set screw 333 in the hub portion 325.

One end of the cross shaft 324 has a retaining collar 334 secured thereto outside the adjacent bearing 323 while the opposite end of the cross shaft extends beyond the opposite bearing 323 and has a pulley 335 secured thereto. A drive pulley 336 is secured to the drive shaft 30 adjacent the star wheel bracket 321 and trained around this pulley and the pulley 335 is a V-belt 337 whereby to rotate the star wheels in timed relation to the advance of pears by the screw feed 235 in a direction such that the radial rods 328 swing substantially in the direction of movement of the pears along the sides of the trough but at a slightly greater speed relative thereto.

By the foregoing arrangement, the neck portion of any pears arriving laterally disposed in the discharge half of the trough, i. e., with their neck portions lying against one or the other conveyor screw and their stem ends extending laterally from the trough, will be engaged by the rods 328 and kicked forward whereby the pear is turned sidewise until its stem end is disposed in leading position in the trough.

A conduit 350 is supported above the trough on the bight portions of the bows 315 hereinbefore mentioned and is secured to these bight portions in alignment with the longitudinal axis of the trough by U-bolts 351. One end of this conduit is connected to a water supply pipe 352 having a suitable control valve (not shown) and its opposite end is closed by a cap 353. The conduit has a series of apertures 354 formed along its bottom surface for spraying water upon the rolls and the pears moving therealong to wash away any juices exuding from the pears and to reduce the friction between the rolls and pears to a minimum.

Timing and discharge mechanism

The timing and discharge mechanism E is carried by the U-shaped hopper 260 at the discharge end of the feeding and orienting conveyor D. This U-shaped hopper (Fig. 1) has its bight portion secured to a brace rod 360 extending from and rigidly supported by a bracket 361 having its lower end bolted as at 362 to the frame 1 of the pear preparation machine and its upper end secured to a tie rod 363 thereof to align the hopper vertically above the oscillating feed cup, not shown, but constituting a part of the pear feed or transfer mechanism described and shown in the aforementioned copending application Serial No. 523,084.

At the lower edge of the hopper 260 there are a plurality of integrally formed bosses 365 (Figs. 1, 10, 11, 13, 18, and 19), two on each side of the hopper and spaced from each other in alignment with two like spaced bosses on the other side of the hopper. Each of these bosses has a bore 366 (Fig. 16) formed therein transversely with respect to the trough T to provide aligned bushings 367 adjacent the discharge end of the feeding and orienting conveyor as well as aligned bushings 368 adjacent the bight portion of the U-shaped hopper.

Pivotally arranged between these aligned bosses (Figs. 18 and 20) is a frustoconical open ended pear positioning and centering pocket or feed trap 370 comprising a pair of jaws 371 and 372. The jaw 371 has a mounting hub 373 formed at its upper end and secured to a shaft 374 the ends of which are supported for rotation in the aligned bushings 368. The jaw 372 is split vertically at its center and has its segmental sides joined at their lower ends by a U-bar forming an integral part therewith as seen in Figs. 19 and 20. The upper ends of the split jaw 372 are provided with spaced bosses 375 which straddle the discharge pulley 292. Aligned shafts 376 and 377 are secured to and extend laterally from each of the respective spaced bosses 375 into their respective bushings 367 to support the split jaw 372 for swinging movement relative to the hopper 260.

The shafts 374 and 376 on one side of the hopper each have a depending arm 378 secured thereto adjacent the jaws 371 and 372 and these shafts extend beyond the spaced bosses 365 to receive bell crank levers 379 and 380, respectively, which are secured to the shafts 374 and 376 by set screws. The lateral arms of the bell crank levers 379 and 380 have their ends disposed beside each other, the lateral arm of lever 380 carrying a pin 382 which extends through a slot 383 formed in the lateral arm of lever 379 to link the levers, their shafts, and their respective jaws for simultaneous rocking movement toward and away from each other. The depending arms of the bell crank levers 379 and 380 correspond to and are spaced from the aforementioned depending arms 378. The lower ends of each set of these corresponding arms are joined by separate cross pins 384. The cross pin on one set of depending arms (Figs. 13 and 18) carries a piston 385 while the cross pin on the other set carries a cylinder 386. The piston 385 is slidably arranged in the cylinder 386 as seen in Fig. 18 to provide a pneumatic control unit 387. The ends of the cross pins 384 extend beyond the bell crank levers and each have an eye formation 388 for receiving the hooked end of a tension spring 389. The spring 389 draws the depending arms as well as the jaws 371 and 372 of the feed trap toward each other, and urges the lateral arms of the bell crank levers into engagement with a stop lug 390 bolted as at 391 to the side wall of the hopper 260 thereby normally holding the jaws of the centering pocket or feed trap in closed or pear receiving position, as seen in Figs. 11, 18, and 20 to receive the pears stem end first from the screw feed 235.

An inlet tube 400 (Fig. 18) extends downwardly from the cylinder 286 for connection to a flexible air conduit 401 to conduct compressed air to the chamber of the control unit 387 at timed intervals as controlled automatically by the operation of the pear preparation machine.

The conduit 401 (Fig. 1) is connected to an air control valve 402 which in turn is connected to an air supply pipe 403. The valve 402 is suitably mounted on the turret housing 3 of the pear preparation machine and has a valve stem 404 extending radially relative to the turret 5 just below the rest position of one of the stemming tubes 7. The valve stem 404 is normally urged into valve closing position, in a manner as shown in the copending application Serial No. 523,084 previously referred to, and engages a cam lever 405 pivotally mounted as at 406 on the turret housing 3. The free end of the cam lever 405 extends into the path of the stemming tube supports 6 on the turret during their intermittent movement by the turret. As the supports 6 move away from rest position, the cam lever 405 is engaged thereby and urged outwardly thereby depressing the valve stem to momentarily open the control valve and to instantaneously admit compressed air into the cylinder 386 of the control unit 387 to quickly extend the piston and cylinder thereof and to instantaneously swing the jaws 371 and 372 to open position whereby the pear held by the feed trap is instantaneously released for free fall in oriented position into the feed cup of the pear preparation machine (not shown but forming a part of the copending application hereinbefore referred to). The cylinder 386 is provided with an aperture 407 from which the air bleeds during the operation of the control unit 387.

The length of the cam lever 405 and its extension into the path of the stemming tube supports 6 determines the length of time the valve will be held open and as the engaging stemming tube support 6 moves out of engagement with the cam lever 405 the valve stem 404 returns to normal position under the action of a spring inside the valve housing whereby the valve is closed.

The moment the valve is closed the air pressure in the cylinder 386 is released by reason of the air relief aperture 407 therein so that the feed trap 370 is closed under the action of spring 389 for reception of the next successive pear.

Operation

At the beginning of the operation of the machine of the present invention the supply conveyor A and the pear preparation machine F are set in motion by their respective drive means previously referred to herein whereby the transfer conveyor C, the feeding and orienting conveyor D, and the discharge mechanism E are operated in timed relation with the pear preparation machine. The empty transfer conveyor C is disposed in its uppermost position and the gate 218 of the feed control mechanism B is in its lowermost or open position as shown in Fig. 1.

The pears to be oriented and fed by the machine of the present invention are deposited upon the continuously moving belt 67 at the inlet 121d of the supply conveyor A either by a conveyor or by dumping the pears directly from the boxes upon the belt 67. The supply of the pears is so regulated that the supply conveyor A is not overloaded but a sufficient quantity of pears is maintained on the belt 67 for transfer to the conveyor C to assure continuous feeding of the fruit without interruption from the transfer conveyor C to the feeding and orienting conveyor D.

The pears deposited upon the belt 67 are advanced by the same in the direction of arrow 67a (Fig. 1). As previously stated herein, the belt 67 is tilted toward the side 122a and opening 133 while it travels in upwardly inclined direction over the block 134 toward the ridge 137 thereof, so that the pears supported on the belt 67 are urged toward the opening 133 and are discharged through the same into the transfer conveyor C.

After a limited number of pears has been discharged from the supply conveyor A into the continuously rotating hopper 150 of the transfer conveyor C, the weight of the pears in the hopper overcomes the counterbalancing effect of the compression spring 166 and the hopper 150 is weighed down under the load of the fruit whereby the hopper 150 and the carriage 178 thereof are swung downwardly from their full line to their dotted line position in Fig. 9. The descent of the circular plate 179 of the transfer conveyor C depresses the short lever of the rocker arm 224 and raises the longer lever thereof whereby the discharge gate 218 is moved upwardly from its open position shown in full lines in Fig. 9 to its closed position shown in dotted lines in said figure, and further discharge of the pears from the supply conveyor A to the transfer conveyor C is interrupted.

As soon as the discharge gate 218 is closed, the pears advanced by the conveyor belt 67 continue their travel past the ridge 137 toward the curved end wall 121 and are transferred thereby upon the conveyor belt 66 which returns the pears toward the inlet end of the conveyor where they are transferred back upon the belt 67 by the curved end wall 121a. In this way any pears not discharged through the opening 133 are returned upon the belt 67 and are again advanced toward the discharge opening 133 together with the new pears fed to the conveyor at the inlet 121d thereof. Therefore, as soon as the gate 218 opens again, another batch of pears is discharged from the supply conveyor into the transfer conveyor in the same manner as previously stated herein.

The hopper 150 of the transfer conveyor C rotates continuously in a clockwise direction as indicated by arrow 503 in Fig. 1 and, since the hopper is mounted in an inclined position, the pears received therein will tumble toward the lowermost region thereof and drop one at a time into each pocket 191 while the pears not received in the pockets always tumble along and remain at the lowermost region of the hopper 150. As previously stated herein, the pockets 191 are of such size that only one pear at a time is received in each pocket and segregated from the remaining pears in the hopper during rotation of the same. The pears received in the pockets 191 are carried along with the hopper 150 during the continuous rotation of the same and are advanced along the inclined stationary plate 179 until they arrive at the gradually declining chute 193 and are gradually lowered in the pockets and finally discharged through the discharge opening 194 in the plate 179 at the time each respective pocket registers with the same.

About 10 to 13 pears are deposited into the hopper C at the commencement of the operation of the machine. However, as soon as 4 to 5 pears have been discharged from the hopper 150 the weight of the remaining pears in the hopper is insufficient to counteract the action of the spring 166 so that the hopper is elevated thereby and the gate 218 is opened whereby another batch of pears, about 4 to 5 pears, is admitted into the hopper 150 until the hopper is weighed down and the gate 218 is closed in the same manner as previously explained herein. In this way, the supply of pears in the hopper 150 is continuously replenished during the operation of the machine and the hopper is not allowed to run empty since this would cause interruption of the continuous feeding of the fruit to the pear preparation machine.

If it is desired to increase or reduce the quantity of pears discharged into the transfer conveyor C at a time, it is only necessary to reduce or increase the tension of the spring 166 as will be obvious to those skilled in the art.

Each pear discharged by the transfer conveyor C through the discharge opening 194 thereof is deposited into the declined discharge chute 195 which in turn discharges the pear past the flap 198 directly upon the receiving end of the feed screws 236 and into the first traveling pocket 273 formed by the threads thereof. The flap 198 reduces the momentum of the pear sufficiently to prevent it from rolling into the preceding pocket 273. It should be further noted that the continuous rotation of the feed screws in opposite directions, i. e., in the directions as indicated by arrows 238a and 238b, respectively, is timed in such a manner with respect to the operation to the transfer conveyor C that only one pear is deposited into each traveling pocket 273 of the feed screws at the time it is in fruit receiving position beneath the discharge chute 195. The pears successively deposited into successive pockets 273 traveling from the receiving to the discharge end of the trough T are advanced along the trough T by the spirally trending and oppositely convoluted threads 270 of the feed screws in a single file in predetermined spaced relation with respect to each other and in timed relation with respect to the operation of the discharge mechanism E.

The pears deposited upon the feed screws 236 may be disposed with their stem blossom axes in almost any angular direction and, consequently, will begin their travel along the trough T in different positions relative thereto and it is the function of the feed and orienting conveyor D to orient the pears during their conveyance in such a manner that when the pears arrive at the timing or discharge station E they are all arranged in a predetermined manner with their stem ends disposed in leading position and with the stem end or neck portions of the fruit in contact with the center belt 296 while the bulb portions of the pears are disposed in trailing position within the trough T so that they rest on and between adjacent conveyor rolls 236 and are engaged by the threads 270 of the same at points X—X (Fig. 14) transversely of the trough.

It is, therefore, apparent that pears dropped onto the feed screws 236 and into the traveling pockets 273 thereof with their stem ends disposed in leading position and with their bulb ends resting on and between the tubular portions of adjacent conveyor screws will remain in this position by the reason of the constant forward drag of the center belt 296 on their stem portions, which prevents turning of the pears by the threads of the screws, and will be advanced in this position along the trough toward the discharge end thereof by the spirally trending threads 270 which engage the bulb portion of the pears at opposite points X—X during the continuous rotation of the feed screws 236 and exert a forward thrust against the same.

Pears deposited on the feed screws with their stem ends disposed in trailing position, as shown in dotted lines a 505 in Figs. 10 and 11, are oriented by the combined action of the tubular portions and threads of the feed screws in the manner as illustrated in sequence by the pears shown in dotted lines a 506 to 510 in Figs. 10 and 11.

The neck portion of such pears is engaged and lifted upwardly by the rearwardly inclined and upwardly moving threads 270 of the feed screws 236 at the trailing end of the pocket within which they are disposed as shown at 506. While the neck end of the pears is lifted upwardly the same drops sidewise either against the conveyor screw 236a, as shown at 507 in Fig. 10, or against the conveyor screw 236b, as shown at 507a in Fig. 11.

When the pear arrives at the position, as shown at 507 in Fig. 10, the threads of both conveyor screws 236 engage the bulb end of the fruit and tend to lift the same thereby causing rolling advancement of the bulb end of the fruit along the trough from position 507 to position 509 (Fig. 10). In view of this rolling advancement of the bulb portion, the neck end of the fruit is caused to roll along the tubular portion of the conveyor screw 236a and is swung laterally around in clockwise direction from position 507 to position 508 and finally to position 509 whereupon it slides downward along the tubular portion of the conveyor screw 236a into the trough until it contacts the center belt 296 and is disposed in leading position in the trough T, as shown at 510 in Fig. 10.

If the neck end of the pear drops against the feed screw 236b, as shown at 507a in Fig. 11, it is oriented in substantially the same manner as described in the above with the exception that in this case the neck end of the pear rolls along the tubular portion of the conveyor screw 236b and is swung around in counterclockwise direction from position 507a (Fig. 11) to position 508a and 509a until the neck end slides downwardly the tubular portion of the feed screw 236b and is disposed in leading position upon the center belt 296, as shown at 510 in Fig. 11.

Sometimes, however, if a perfectly symmetrical pear is deposited upon the feed screws with its stem end in trailing position, the neck end of the pear may not drop sidewise against the tubular portion of one or the other feed screw as it is lifted upwardly by the threads 270, but may be swung directly over the bulb portion into leading position in the trough during the rolling advancement of the fruit.

In either case, however, the rotation or rolling of the fruit is immediately arrested as soon as the leading stem end of the fruit contacts the center belt 296 which, since it travels faster than the advancing fruit, exerts a forward drag on the stem end thereof and thereby maintains the fruit with its stem end in leading position, as shown at 510 in Figs. 10 and 11, during further conveyance of the fruit by the threads 270 toward the discharge end of the trough.

If a pear is deposited into the trough T with the stem blossom axis disposed transversely thereof and with its neck portion lying either on the tubular portion of the feed screw 236a, as shown in dotted lines at 508 in Fig. 10, or on the tubular portion of the feed screw 236b, as shown in dotted lines at 508a in Fig. 11, the advancing rearwardly inclined and upwardly and outwardly revolving threads 270 of opposing screws will roll the bulb portion of the pear along the trough whereby the neck portion of the pear is rolled along the tubular portion of the feed screw against which it is resting and is swung forward, as shown at 509 and 509a, respectively, so that it slides down the tubular portion of the feed screw 236a or 236b into leading position in the trough and into contact with the center belt 296, as shown at 510 in Figs. 10 and 11.

Some pears, however, especially if they have a flat calyx portion, may not be turned around during their advancement by the normal threads 270 of the conveyor screws in the manner as above described, but will remain transversely disposed in the trough either in a position as shown in dotted lines at 508 in Fig. 10 or in a position as shown in dotted lines at 508a in Fig. 11 since the flat calyx portion resting against the tubular portion of one or the other conveyor screw 236b or 236a, respectively, holds the pears in a comparatively stable position so that they will not turn in the manner as above described. These pears are therefore advanced in this position by the threads 270 until their bulb portion is engaged by one of the accelerated or lead portions 274 of the conveyor screw against which their neck end is leaning.

For instance, if a pear remains in the position as shown at 508 in Fig. 10, it is advanced in this position along the trough T until it is engaged by the lead portion 274a or 274b of the conveyor screw 236a. The action of both of these lead portions upon the fruit is the same and, therefore, only the action of the lead portion 274a is specifically described herein. If the fruit disposed in the trough, as shown at 508 in Fig. 10, arrives in this position at the lead portion 274a, the same sweeps from below against the bulb portion of the pear whereby the pear is suddenly lifted and kicked forward with accelerated speed along the trough T and out of engagement with the normal threads 270 at the trailing end of the pocket, as shown in dotted lines at 512 in Fig. 10. The component force of this sudden upward and forward kick causes the pear to turn laterally in clockwise direction from position 512 to the position as shown at 513 in Fig. 10 and to finally slide with its neck end downwardly on the tubular portion of the feed screw 236a into leading position in the trough and into contact with the center belt 296, as shown at 514 in Fig. 10.

If the pear is disposed and advanced in a position as shown at 508a in Fig. 11, the bulb portion thereof is engaged either by the lead portion 274c or 274d during the travel of the pear along the trough which both function in the same manner to turn the fruit with its stem end into leading position. For instance, if the bulb portion of the pear is engaged by the lead portion 274c, as shown in dotted lines at 516 in Fig. 10, the fruit is suddenly kicked upward and forward out of engagement with the normal thread portions 270 whereby the neck end of the pear is swung forward and the fruit is turned laterally in counterclockwise direction from position 516 to position 517 (Figs. 10 and 11) so that the neck end slides down the tubular portion of the feed screw 236b into leading position in the trough and into contact with the center belt 296, as shown at 518 in Figs. 10 and 11.

Should the lead portions 274 of the feed screws, however, fail to turn the pears in the manner as above described and a pear remain in a position with its stem blossom axis transversely disposed relative to the trough and with its neck lying on one or the other feed screw, as shown at 512 and 516 in Fig. 10, and be advanced in this position toward the continuously rotating star wheels 320, the rods 328 thereof will engage the neck end of such pears and kick the same forward into leading position in the trough.

During the operation of the machine water is sprayed from the overhead conduit 350 upon the advancing pears and the feed screws, which serves as a lubricant to reduce the friction between the pears and the feed screws to a minimum and to prevent tackiness of the feed screws due to fruit juices adhering to the same.

In the normal operation of the feed and orienting conveyor D, the majority of pears are oriented during their conveyance within the traveling pockets formed by the first five convolutions of the threads of the opposing feed screws whereupon the center belt 296, which travels at a greater speed than the pears, exerts a continuous forward drag upon the leading stem ends of the fruit and maintains the pears in oriented position while the thread portions 270 of adjacent feed screws engage the bulb ends of the fruit and convey the pears in properly timed and spaced relation with only one pear disposed in each traveling pocket 273 toward the discharge mechanism E.

As the pears arrive in succession at the discharge end of the trough T, the final convolution of the threads 270 transfers each individual pear onto the rounded block formations 263 in the hopper 260 and, due to the configuration of these block formations, the stem end of each fruit is tilted downward and the fruit is lowered into engagement with the center belt 296 which finally carries the fruit into the hopper 260 and deposits the fruit, stem end down into the same (see Fig. 11).

Each pear so discharged into the hopper 260 gravitates stem end first into the closed pear positioning and centering pocket or feed trap 370 which receives the fruit and centers the same therein with the stem blossom axis of the fruit disposed in substantially vertical position for transfer into the oscillating feed cup (not shown) of the pear preparation machine. The pocket 370 is so positioned relative to the oscillating feed cup that when the latter is in fruit receiving position it is axially aligned therewith and disposed therebeneath. The construction and operation of this oscillating feed cup has been clearly set forth in the copending application Serial No. 523,804 previously referred to herein.

While the pear is held in the pocket 370 the turret 5 of the pear preparation machine F begins one of its intermittent movements and causes the stemming tube holder 6 to momentarily depress the cam 405 and the valve stem 404 of the valve 402 whereby the pneumatic control unit 387 is actuated causing instantaneous opening of the jaws of the feed trap 370 thereby instantaneously releasing the pear therefrom, without disturbing its oriented and centered position, for free fall into the oscillating feed cup of the pear preparation machine disposed at this time in fruit receiving position therebeneath.

Since the stemming tube holder 6 travels rapidly past the cam 405 during the intermittent movement of the turret 5, the valve 402, which controls the admittance of compressed air to the pneumatic control unit 387, is quickly opened and closed so that the jaws of the feed trap 370 are only momentarily opened and are therefore again in closed position prior to the arrival of the next successive pear discharged from the feed trough T into the pocket 370 of the discharge mechanism E.

In this manner the pears are continuously fed from the supply conveyor A to the feed trap 370 of the discharge mechanism E and are oriented during their conveyance along the orienting conveyor D so that all pears are deposited in predetermined position, i. e., stem end down into the feed trap 370 and are discharged therefrom in said position either into the oscillating feed cup of a pear preparation machine of the type referred to herein or to the pear holding or transfer means of any other type of pear handling machine in connection with which the apparatus of the present invention may be used.

While I have shown and described a preferred embodiment of my invention, it will be understood that various changes and modifications may be made without departing from the spirit of the present invention. It is to be understood, therefore, that the scope of the invention should be limited only by the scope and proper interpretation of the claims appended hereto.

Having thus described my invention, what I claim as new and desire to protect by Letters Patent is:

1. A pear feeding and orienting apparatus comprising a supply conveyor, a transfer conveyor, means operable by the amount of pears in the transfer conveyor for controlling the discharge of batches of pears from the supply to the transfer conveyor, said transfer conveyor including means for discharging pears in succession therefrom, and a feeding and orienting conveyor for receiving the pears from the transfer conveyor, for orienting the pears and for feeding them in oriented position to a place of deposit.

2. A pear feeding and orienting apparatus comprising a supply conveyor, a transfer conveyor, said supply conveyor being adapted to discharge pears into the transfer conveyor, means operable by the transfer conveyor intermediate said supply and transfer conveyors for controlling the discharge of pears into the transfer conveyor, said transfer conveyor including means for discharging pears in succession therefrom, and a feeding and orienting conveyor for receiving the pears from the transfer conveyor, for orienting the pears and for discharging them in oriented position and timed relation therefrom.

3. A pear feeding and orienting apparatus comprising a supply conveyor, a continuously rotatable weighing hopper, said supply conveyor being adapted to discharge pears therefrom to the weighing hopper, means intermediate said supply conveyor and weighing hopper for controlling the discharge of pluralities of pears into the latter in accordance with the weight of the pears therein, said weighing hopper including means for continuously discharging pears in timed, individual succession therefrom, and a feeding and orienting conveyor for receiving the pears from the transfer conveyor, for orienting the pears and for discharging them in oriented position and timed relation therefrom.

4. A pear feeding and orienting apparatus comprising a transfer conveyor, means for periodically supplying batches of pears to the transfer conveyor, a pear feeding and orienting mechanism associated with the transfer conveyor, and means for operating said transfer conveyor and orienting mechanism in synchronism for discharging individual pears in timed intervals from the transfer conveyor into the orienting mechanism and for advancing them through said orienting mechanism in spaced relation, said orienting mechanism including means for orienting the pears incident to their advacement to dispose them in a predetermined position.

5. A pear feeding and orienting apparatus comprising a supply conveyor adapted to receive a promiscuous mass of pears, said conveyor having a discharge opening through which pears may pass, means associated with said conveyor for directing pears through said discharge opening, means for controlling the passage of pears in batches through said opening, a feeding and orienting conveyor, a transfer conveyor associated with the supply conveyor and said feeding and orienting conveyor for receiving the batches of pears directed through the discharge opening of the supply conveyor and for discharging them in timed succession into said feeding and orienting conveyor, said feeding and orienting conveyor including means for conveying said pears to a place of reception and for effecting rolling and sidewise turning of the pears during their conveyance to dispose their stem ends foremost prior to their arrival at said place of reception.

6. A pear feeding and orienting apparatus comprising a supply conveyor adapted to receive a promiscuous mass of pears, said conveyor having a discharge opening formed therein, means associated with said conveyor for directing pears through said discharge opening, a feeding and orienting conveyor, means associated with the supply and orienting conveyors for receiving said pears directed through said discharge opening and for depositing them consecutively upon said feeding and orienting conveyor, said feeding and orienting conveyor including means for advancing pears in spaced relation and for simultaneously effecting rolling and sidewise turning of the pears to dispose them stem end foremost, a feed receptacle associated with said feeding and orienting conveyor for receiving the pears stem end first therefrom, and means for opening and closing the receptacle at timed intervals to discharge the pears stem end first therefrom.

7. A pear feeding and orienting apparatus comprising a supply conveyor adapted to receive a promiscuous mass of pears, said conveyor having a discharge opening formed therein, means associated with said conveyor for effecting discharge of pears in batches through said opening, means for receiving the pears discharged from said conveyor for separating said pears and for discharging them therefrom in consecutive order, means controlled by the amount of pears in said receiving and separating means for controlling the discharge of pears through said opening, an aligner trough arranged to receive the pears discharged from said separating means, means in said trough for advancing the pears therealong and for orienting them with their stem ends foremost therein, and means in said trough for maintaining said pears in their oriented position.

8. A pear feed comprising a conveyor, means for supplying pears to said conveyor, orienting means arranged to receive pears from said conveyor, means for actuating said orienting means to orient the pears and to discharge them in a predetermined position therefrom, said conveyor having pear receiving pockets for isolating a pear in each pocket from the remaining pears in said conveyor, means associated with the conveyor for interrupting the supply of pears into the latter upon accumulation of a limited maximum number of pears therein, and for resuming the supply upon the reduction of pears therein to a predetermined minimum, and means for operating the conveyor for discharging the isolated pears from the pockets thereof onto the orienting means in successive order commensurate with the discharge of the pears from the latter.

9. In a pear feeding and orienting apparatus a transfer conveyor comprising a rotary hopper for receiving pears and for discharging them individually therefrom, means for feeding pears to said hopper, a support, means for movably mounting said hopper on said support for up and down movement relative thereto, means for rotatably supporting said hopper on said mounting means, means associated with said mounting means for rotating said hopper, means for normally maintaining said hopper in its uppermost position, and means cooperating with said mounting means for controlling the admission of pears to said hopper in accordance with the up and down movement of the hopper under the weight of the pears deposited therein.

10. In a pear feeding and orienting apparatus a transfer conveyor comprising a pear receiving hopper, means for feeding pears to said hopper, said hopper being provided with a plurality of pockets for separating individual pears from the remaining pears in said hopper, a support, means for movably mounting said hopper in tilted position on said support, said mounting means being provided with an opening, means for rotatably supporting said hopper on said mounting means, means associated with said mounting means for rotating the hopper relative thereto and for effecting discharge of the pears from the pockets of said hopper upon registration thereof with said opening, means for normally maintaining the hopper in its uppermost position, and means cooperating with said hopper mounting means and said feeding means for controlling the admission of pears to said hopper in accordance with the up and down movement thereof responsive to the weight of the pears in said hopper.

11. In a pear feeding and orienting apparatus a transfer conveyor comprising a rotary hopper for receiving pears and for discharging them individually therefrom, a support, a weighing beam mounted for pivotal movement about an axis on said support for supporting said hopper for rotation and up and down movement relative to said support, means for normally maintaining said hopper and beam in elevated position but permitting downward movement thereof under the weight of pears deposited in said hopper, and means for rotating said hopper comprising a fixed drive member and a power transmission unit movable with said beam and operatively associated with the hopper, said power transmission unit including a driven member so disposed adjacent the pivotal axis of the beam on said support that the driving connection of the driving and driven member is maintained during the tilting movement of the hopper and beam relative to said support.

12. In a fruit feeding apparatus, means for continuously moving an indiscriminate mass of fruit in a closed path for passing in proximity to a discharge opening, means for controlling the discharge of fruit in batches through said opening, a transfer device for receiving fruit discharged through said opening including isolating means whereby the fruit is delivered individually from the transfer means, and means responsive to the fruit in said transfer device for actuating said controlling means.

13. In a fruit feeding apparatus, means comprising oppositely moving flight of conveyor belts for continuously moving an indiscriminate mass of fruit in proximity to a discharge opening, means for controlling the discharge of fruit through said opening, means for receiving fruit discharged through said opening and means responsive to the fruit in said receiving means for actuating said controlling means.

14. In a device of the character described means for delivering individual fruit in timed intervals comprising a rotary hopper mounted for rotation on a substantially vertical axis, a plurality of open ended individual pockets in said hopper each conforming in size to the approximate size of the fruit to be individually delivered therefrom, a stationary plate beneath said hopper having an opening with which said pockets successively register during rotation of the hopper to permit each pocket to successively deliver its contents therethrough, a control element for controlling the supply of fruit to the hopper, and means operable by said hopper for actuating said control element.

15. In a device of the character described means for delivering individual fruit in timed intervals comprising a rotary hopper mounted for rotation on a substantially vertical axis, a plurality of open ended individual pockets in said hopper each conforming in size to the approximate size of the fruit to be individually delivered therefrom, a stationary plate beneath said hopper having an opening with which said pockets successively register during rotation of the hopper to permit each pocket to successively deliver its contents therethrough, means mounting the hopper for bodily movement in response to the amount of fruit therein, and means for controlling the supply of fruit thereto in response to the bodily movement thereof.

ALBERT R. THOMPSON.

REFERENCES CITED

The following references are of record in the file of this patent:

UNITED STATES PATENTS

| Number | Name | Date |
| --- | --- | --- |
| 398,651 | Peters | Feb. 26, 1889 |
| 550,010 | Williams | Nov. 19, 1895 |
| 573,560 | Whitmarsh | Dec. 22, 1896 |
| 580,742 | Vrooman et al. | Apr. 13, 1897 |
| 801,414 | Stebler | Oct. 10, 1905 |
| 971,999 | Hodge | Oct. 4, 1910 |
| 1,713,684 | Wild | May 21, 1929 |
| 1,750,328 | Patchen et al. | Mar. 11, 1930 |
| 1,750,329 | Patchen et al. | Mar. 11, 1930 |
| 1,972,488 | Kimball et al. | Sept. 4, 1934 |
| 2,111,730 | Rabens | Mar. 22, 1938 |
| 2,303,754 | Newton | Dec. 1, 1942 |
| 2,336,606 | Everett | Dec. 14, 1943 |
| 2,336,676 | Erickson et al. | Dec. 14, 1943 |
| 2,367,757 | Cutler | Jan. 23, 1945 |
| 2,377,431 | Lakso | June 5, 1945 |
| 2,471,479 | Coons | May 31, 1949 |